US006987531B2

(12) United States Patent
Kamon

(10) Patent No.: US 6,987,531 B2
(45) **Date of Patent: *Jan. 17, 2006**

(54) IMAGING SYSTEM, PHOTOGRAPHING DEVICE AND THREE-DIMENSIONAL MEASUREMENT AUXILIARY UNIT USED FOR THE SYSTEM

(75) Inventor: Koichi Kamon, Sakai (JP)

(73) Assignee: Minolta Co., Ltd., Osaka (JP)

(*) Notice: Subject to any disclaimer, the term of this patent is extended or adjusted under 35 U.S.C. 154(b) by 396 days.

This patent is subject to a terminal disclaimer.

(21) Appl. No.: 10/233,415

(22) Filed: Sep. 4, 2002

(65) Prior Publication Data

US 2003/0043277 A1 Mar. 6, 2003

(30) Foreign Application Priority Data

Sep. 4, 2001 (JP) ............................ 2001-266679

(51) Int. Cl.
*H04N 5/232* (2006.01)
*G06K 9/00* (2006.01)
*G01B 11/24* (2006.01)

(52) U.S. Cl. .................. 348/211.4; 348/135; 348/348; 382/154; 702/152; 356/603

(58) Field of Classification Search ................ 348/135, 348/370, 47, 211.1, 211.4, 211.5, 211.9, 231.3, 348/231.6, 348, 138, 139, 140; 382/154; 702/152, 153; 250/559.31, 559.38; 356/3.01, 356/602, 603, 611
See application file for complete search history.

(56) References Cited

U.S. PATENT DOCUMENTS

| | | | | |
|---|---|---|---|---|
| 5,981,965 | A * | 11/1999 | Pryor et al. | 250/559.23 |
| 6,049,385 | A * | 4/2000 | Norita et al. | 250/559.22 |
| 6,211,506 | B1 * | 4/2001 | Pryor et al. | 250/208.1 |
| 6,233,049 | B1 * | 5/2001 | Kondo et al. | 356/623 |
| 6,323,942 | B1 * | 11/2001 | Bamji | 356/5.01 |
| 6,421,114 | B1 * | 7/2002 | Miyazaki et al. | 356/3.01 |
| 6,437,853 | B2 * | 8/2002 | Seo | 348/296 |
| 6,507,406 | B1 * | 1/2003 | Yagi et al. | 356/602 |
| 6,529,280 | B1 * | 3/2003 | Yahashi et al. | 356/602 |
| 6,538,751 | B2 * | 3/2003 | Ono | 356/602 |
| 6,549,289 | B1 * | 4/2003 | Ellis | 348/135 |
| 6,587,183 | B1 * | 7/2003 | Uomori et al. | 356/3.1 |
| 6,822,687 | B1 * | 11/2004 | Kakiuchi et al. | 348/348 |
| 6,882,435 | B2 * | 4/2005 | Yagi et al. | 356/602 |

(Continued)

FOREIGN PATENT DOCUMENTS

JP 11-271030 10/1999

(Continued)

*Primary Examiner*—Wendy R. Garber
*Assistant Examiner*—John M. Villecco
(74) *Attorney, Agent, or Firm*—McDermott Will & Emery LLP

(57) ABSTRACT

An imaging system in which a two-dimensional photographing device and a unit for three-dimensional measurement are removably attached to each other is provided. The system can be easily used for taking a two-dimensional image and for measuring three-dimensional data. The imaging system is used for conducting three-dimensional measurement of an object and taking a two-dimensional image of the object. The system includes a photographing device and a three-dimensional measurement auxiliary unit formed in a housing provided independently of the photographing device to be removably attached to the photographing device. The photographing device can take a two-dimensional image without the unit and can function as a light receiving portion in three-dimensional measurement to conduct three-dimensional measurement in cooperation with the attached three-dimensional measurement auxiliary unit.

18 Claims, 20 Drawing Sheets

U.S. PATENT DOCUMENTS 6,907,139 B2 * 6/2005 Yamamoto .................. 348/47
2002/0021354 A1 * 2/2002 Suzuki et al. ................. 348/46
2002/0089675 A1 * 7/2002 Kamon et al. .............. 356/602
2003/0133130 A1 * 7/2003 Takahashi .................. 356/603
2004/0234260 A1 * 11/2004 Arai et al. .................. 356/603
2005/0041143 A1 * 2/2005 Kakiuchi et al. ........... 348/370

FOREIGN PATENT DOCUMENTS

JP 2000055636 A * 2/2000
JP 2001-280933 10/2001

* cited by examiner

IMAGING SYSTEM, PHOTOGRAPHING DEVICE AND THREE-DIMENSIONAL MEASUREMENT AUXILIARY UNIT USED FOR THE SYSTEM

This application is based on Japanese Patent Application No. 2001-266679 filed on Sep. 4, 2001, the contents of which are hereby incorporated by reference.

BACKGROUND OF THE INVENTION

1. Field of the Invention

The present invention relates to an imaging system for conducting three-dimensional measurement of an object and taking a two-dimensional image of an object, a photographing device and a three-dimensional measurement auxiliary unit that are used for the system.

2. Description of the Prior Art

Conventionally, a digital camera is widely used for photographing a two-dimensional image of an object (an object of shooting) to output the image data. A three-dimensional measurement device as disclosed in Japanese unexamined patent publication No. 11-271030 is used to easily obtain three-dimensional data of an object. The use of three-dimensional data is suitable for a presentation of products, which can be observed from many directions not only from one direction by using the three-dimensional data.

However, three-dimensional data have more information volume compared to two-dimensional data (image data). Therefore, three-dimensional data are hard to deal with because of disadvantages in that data processing is complicated, long processing time is required or large memory capacity is needed. Since each of three-dimensional data and two-dimensional data has advantages and disadvantages as mentioned above, they should be used appropriately depending on purpose. Therefore, an imaging system is needed in which both two-dimensional data and three-dimensional data can be obtained.

An apparatus (VIVID700) that can be used for taking a two-dimensional image and for conducting three-dimensional measurement is provided in the market by the applicants. The apparatus has a two-dimensional photographing device and a three-dimensional measurement device integrally incorporated; so two-dimensional data (a two-dimensional image) and three-dimensional data can be simultaneously obtained with a simple operation.

However, the apparatus has a disadvantage in that the three-dimensional measurement device cannot be separated due to the all-in-one structure, so that the apparatus is larger and harder to handle than a two-dimensional photographing device in the case of taking only a two-dimensional image.

SUMMARY OF THE INVENTION

An object of the present invention is to provide an imaging system in which a two-dimensional photographing device and a unit for three-dimensional measurement are removably attached to each other, so that the system can be easily used for taking a two-dimensional image and for measuring three-dimensional data. Another object of the present invention is to provide a photographing device and a three-dimensional measurement unit that are used for the system.

According to one aspect of the present invention, an imaging system for conducting three-dimensional measurement of an object and taking a two-dimensional image of the object includes a photographing device and a three-dimensional measurement auxiliary unit formed in a housing provided independently of the photographing device to be removably attached to the photographing device, the photographing device being structured so as to take a two-dimensional image without the three-dimensional measurement auxiliary unit, and to function as a light receiving portion in three-dimensional measurement so as to conduct three-dimensional measurement in cooperation with the attached three-dimensional measurement auxiliary unit.

In the preferred embodiment of the present invention, the three-dimensional measurement auxiliary unit is structured so as to transmit measurement mode information indicating a three-dimensional measurement method to the photographing device, and the photographing device selects an operational mode based on the measurement mode information transmitted from the attached three-dimensional measurement auxiliary unit to conduct three-dimensional measurement.

Further, the photographing device is structured so as to select and perform any one of a photographing mode for taking a two-dimensional image and a measurement mode for conducting three-dimensional measurement by the measurement method based on the measurement mode information transmitted from the three-dimensional measurement auxiliary unit, and when the three-dimensional measurement auxiliary unit is attached to the photographing device, the measurement mode is set as an initial value.

As the photographing device, a digital camera is used for obtaining a still image of the object as image data by an area sensor provided in the photographing device, for example.

Other objects and features of the present invention will be made clear by the following explanations about the drawings and embodiments.

DESCRIPTION OF THE PREFERRED EMBODIMENTS

Hereinafter, the present invention will be explained more in detail with reference to embodiments and drawings.

Figure 1:
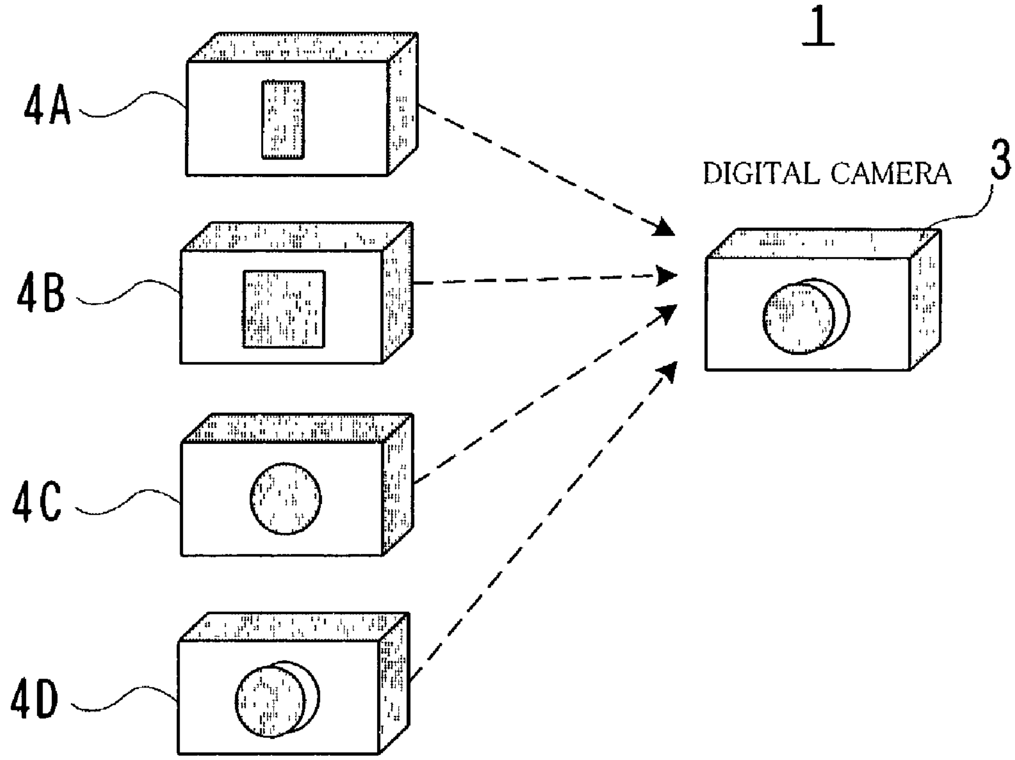
FIG. 1 is a diagram showing an example of an appearance of an imaging system according to the present invention.

FIG. 1 is a diagram showing an example of an appearance of an imaging system 1 according to the present invention. As shown in FIG. 1, the imaging system 1 includes a digital camera 3 as a photographing device and various types of auxiliary units 4 for three-dimensional measurement, each of which is releasably attached to the digital camera 3.

The digital camera 3 has a built-in area sensor and can take a still image (a two-dimensional image) of an object without the auxiliary unit 4. Though being not shown, in addition to the digital camera 3, there may be prepared one or more digital cameras similar to the digital camera 3. Each of the digital cameras has different parameters such as lens focal distance, a photograph angle of view and a resolution. When one of the auxiliary units 4 is attached to the digital camera 3, the digital camera 3 functions as a light receiving portion in three-dimensional measurement to conduct three-dimensional measurement in cooperation with the auxiliary unit 4. More specifically, the digital camera 3 can be switched between two modes; one of which is a photographing mode for taking a two-dimensional image and another of which is a measurement mode for conducting three-dimensional measurement in cooperation with one of the auxiliary units 4.

As the auxiliary unit 4, there are prepared four types of auxiliary units 4A, 4B, 4C and 4D in this embodiment. The auxiliary unit 4A is a unit for a light section method (a light projection unit for a light section method) that conducts three-dimensional measurement by scanning an object using a slit light. If the auxiliary unit 4A is used, a slit light projected therefrom is photographed by the digital camera 3 so that three-dimensional data of the object are calculated based on the obtained slit image.

The auxiliary unit 4B is a unit for a stripe analysis method (a light projection unit for a stripe pattern projection method) that conducts three-dimensional measurement by projecting a stripe pattern onto an object. If the auxiliary unit 4B is used, a stripe pattern projected therefrom is photographed by the digital camera 3 so that three-dimensional data of the object are calculated based on the obtained pattern image.

The auxiliary unit 4C is a unit (a light projection unit for a TOF method) that conducts three-dimensional measurement by a TOF (Time of Flight) method. The auxiliary unit 4D is a unit (a stereophotographic unit) that conducts three-dimensional measurement by a stereophotography. The auxiliary unit 4D can be a digital camera, for example.

Each of the auxiliary units 4A–4D can be replaced with each other with respect to the digital camera 3. Moreover, in addition to the auxiliary units 4A–4D, there may be prepared one or more auxiliary units 4 similar to the auxiliary units 4A–4D. Each of the auxiliary units has the same measurement principle and different parameters such as measurable distance range, a measurable angle of view and a resolution, and can be replaced with each other. Further, it is possible to use other auxiliary units having a different measurement principle.

Each of the auxiliary units 4 memorizes measurement mode information indicating a three-dimensional measurement method and can transmit the measurement mode information to the digital camera 3. An operational mode of the digital camera 3 is selected in accordance with the measurement mode information transmitted from the attached auxiliary unit 4 for conducting three-dimensional measurement.

Figure 2:
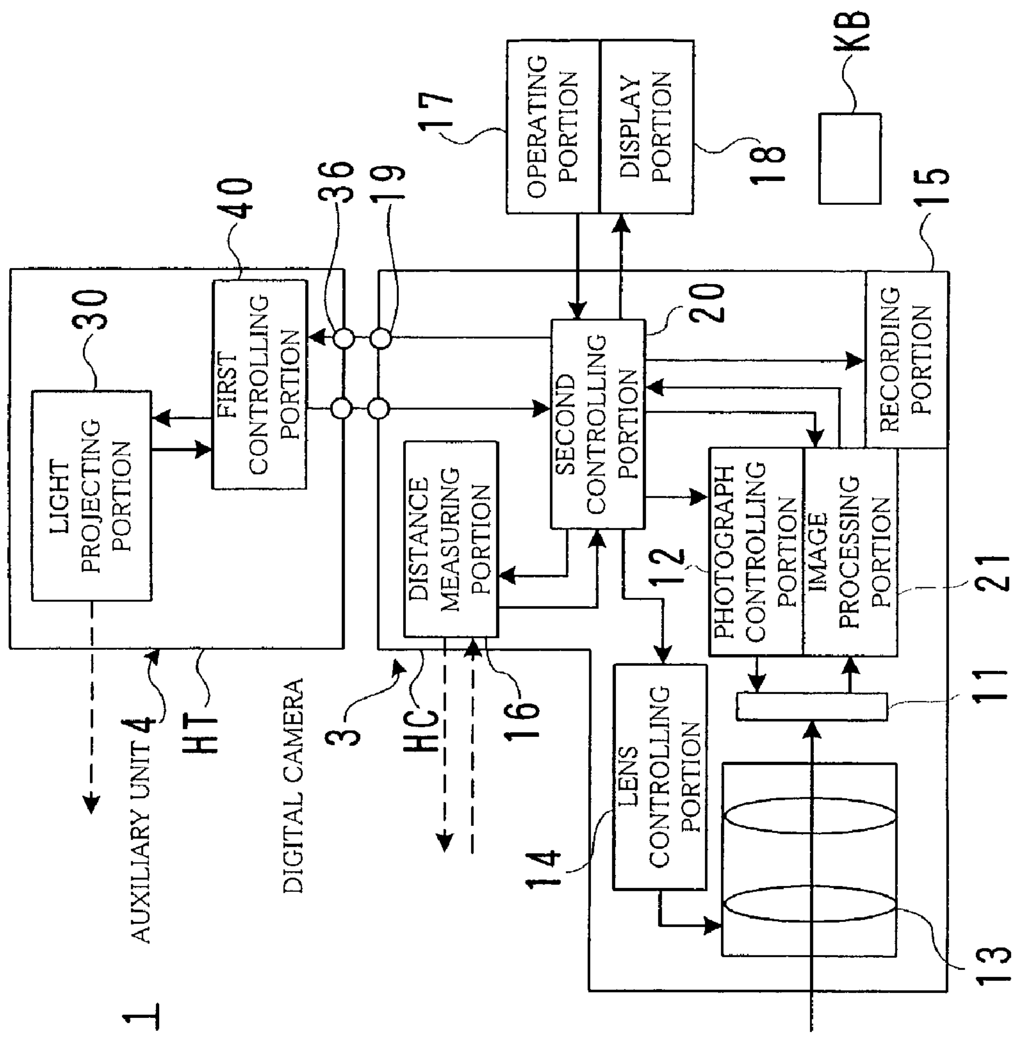
FIG. 2 shows an example of a schematic structure of the imaging system.

FIG. 2 shows an example of a schematic structure of the imaging system 1. As shown in FIG. 2, the imaging system 1 includes the digital camera 3 and the auxiliary unit 4. Though being not shown, a flash lamp is releasbaly attached to the digital camera 3 if necessary.

The digital camera 3 includes a body housing HC, an area sensor 11, a photograph controlling portion 12, a group of lenses 13, a lens controlling portion 14, a recording portion 15, a distance measuring portion 16, an operating portion 17, a display portion 18, a connector 19, a second controlling portion 20 and an image processing portion 21.

The area sensor 11 includes a CCD image sensor or a CMOS image sensor for taking a two-dimensional image of an object (an object of shooting). The photograph controlling portion 12 controls the area sensor 11 so as to read data from the area sensor 11.

The group of lenses 13 includes a zooming lens and a focusing lens. The lens controlling portion 14 conducts automatic focusing control (AF) of the group of lenses 13 so as to focus an image of the object (a shooting object image) on the area sensor 11. The automatic focusing control is conducted based on a measurement result by the distance measuring portion 16.

The recording portion 15 includes an interchangeable recording medium KB such as a flash memory, a smart media, Compact Flash, a PC memory card or an MD (mini-disk), and a disk drive for reading data from such a recording medium KB and for writing data thereon. Further, the recording portion 15 may be an HDD (hard disk drive)

or a magneto-optical recording device. The recording portion 15 records a two-dimensional image taken by the area sensor 11, three-dimensional data (three-dimensional shape data) obtained by three-dimensional measurement and attribution data thereof.

The distance measuring portion 16 can be a known distance measuring device such as a general active type or a distance measuring device such as a passive type, for example. The use of such devices enables distance measurement for one point on the screen within the photograph range.

As the operating portion 17, there are provided a release button, a power supply button, a zooming button, a menu selecting button and other buttons. Two buttons are provided as the zooming button, a first one for a distance (TELE) and a second one for a close (WIDE). Additionally, five buttons are prepared as the menu selecting button; four buttons for moving cursor in the horizontal or the vertical direction and one button for confirming the entry.

The display portion 18 displays the two-dimensional image taken by the area sensor 11. Therefore, the display portion 18 also functions as an electronic viewfinder in two-dimensional image photographing. The display portion 18 displays a menu, a message and other characters or images.

When one of the auxiliary units 4 is attached to the digital camera 3, the display portion 18 displays information indicating measurement range by the auxiliary unit 4, information for designating the measurement range and others along with the two-dimensional image. Further, the display portion 18 displays three-dimensional data obtained by three-dimensional measurement as a grayscale image (a distance image). A menu related to three-dimensional measurement is also displayed on the display portion 18.

The body housing HC is provided with the connector 19 that functions as a connecting node for transmitting and receiving a signal or data (information) between the auxiliary unit 4 and the digital camera 3 when the auxiliary unit 4 is attached to the digital camera 3.

The second controlling portion 20 controls each of portions of the digital camera 3 and controls a communication between the digital camera 3 and a first controlling portion 40 of the auxiliary unit 4. In this communication, the digital camera 3 transmits a release signal (a synchronizing signal). The second controlling portion 20 transmits data of photograph range and a resolution that are parameters of the digital camera 3 and data indicating distance away from an object. The second controlling portion 20 receives data related to measurement principle, measurable distance range, a resolution, a measurable angle of view and others of the auxiliary unit 4. The second controlling portion 20 controls the photographing process of the area sensor 11 through the photograph controlling portion 12 based on the received data so that processing contents in the image processing portion 21 are controlled.

The image processing portion 21 processes image data outputted from the area sensor 11 in accordance with an instruction set by the second controlling portion 20. Three-dimensional data of an object Q are calculated by the processing in the image processing portion 21. Entire or a part of processing for calculating three-dimensional data may be conducted by the second controlling portion 20 instead of the image processing portion 21. This processing may be conducted inside of the auxiliary unit 4.

The digital camera 3 may be provided with an interface such as SCSI, USB, IEEE1394 or others for data communication. An interface using infrared radiation or a wireless line may be provided. Three-dimensional data and a two-dimensional image may be transmitted to an external computer via such an interface.

Each of the portions mentioned above is accommodated in the body housing HC or attached to the surface thereof. The digital camera 3 is constituted as an independent camera by the body housing HC. The digital camera 3 can be used as a general digital camera (an electronic camera) without the auxiliary unit 4.

The auxiliary unit 4 includes a body housing HT, a light projecting portion 30 and the first controlling portion 40, for example. Depending on each type of the auxiliary units 4A–4D that are described above, a suitable light projecting portion 30 is used. The body housing HT is provided independently of the body housing HC of the digital camera 3. The body housings HT and HC are produced by synthetic resin molding, precision casting, sheet metal working, machining of metallic materials or others. Alternatively, a plurality of component parts produced by such methods is assembled by welding, adhesion, fitting, caulking or screwing so as to produce the body housings HT and HC.

Figure 3:
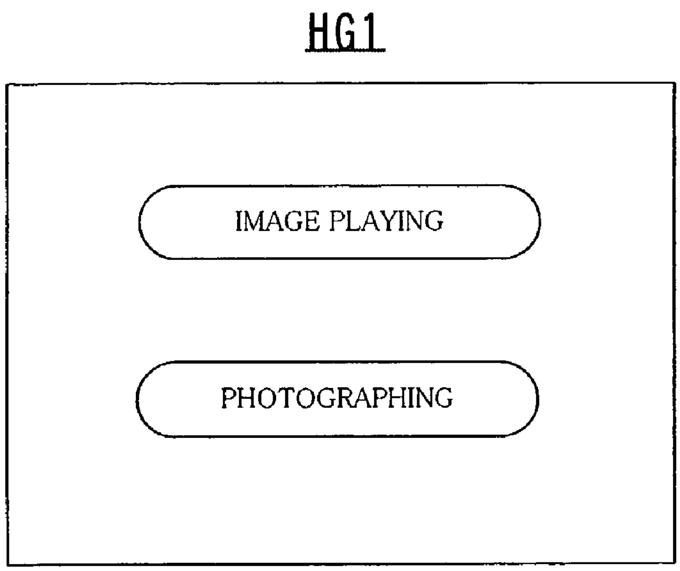
FIG. 3 shows a menu picture for a two-dimensional image.
Figure 4:
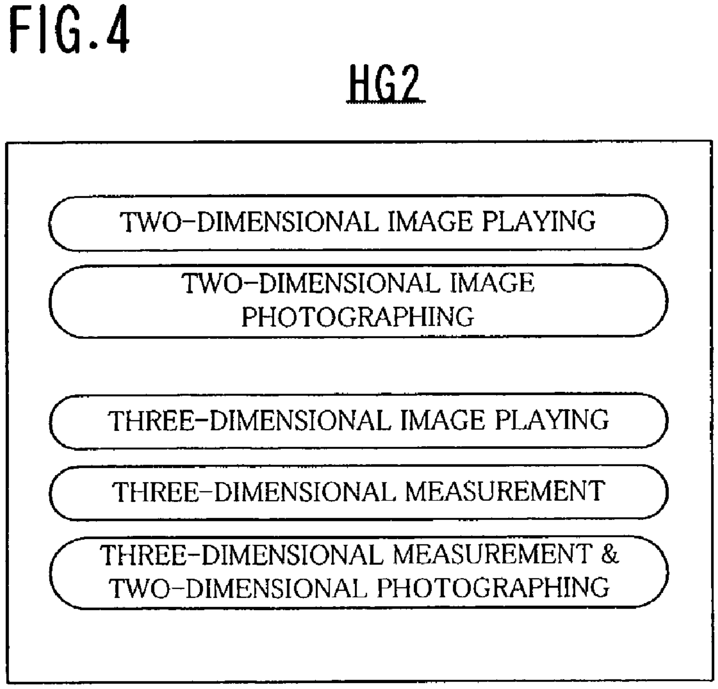
FIG. 4 shows a menu picture for an image and measurement.
Figure 5:
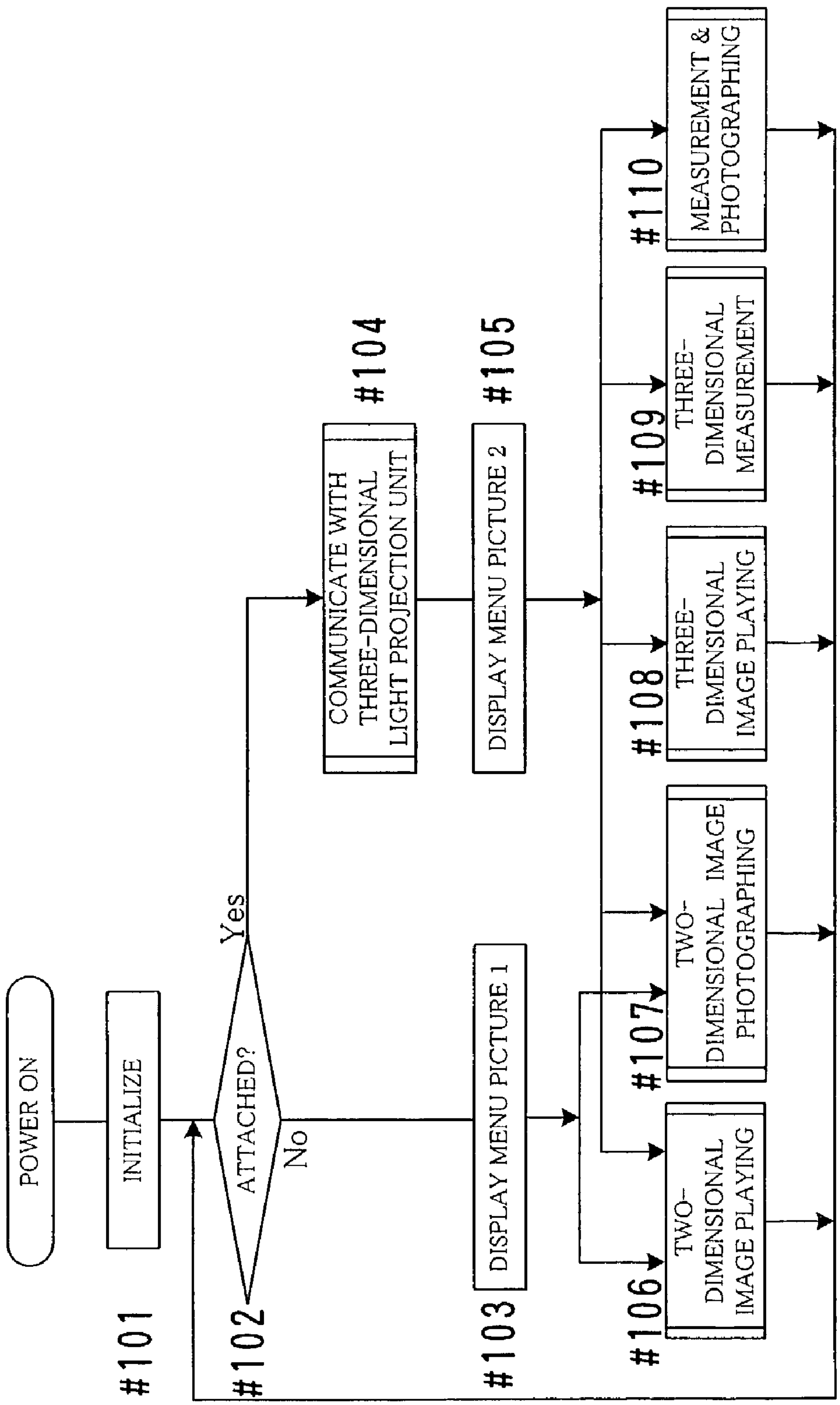
FIG. 5 is a main flowchart showing control contents of a second controlling portion of a digital camera.
Figure 6:
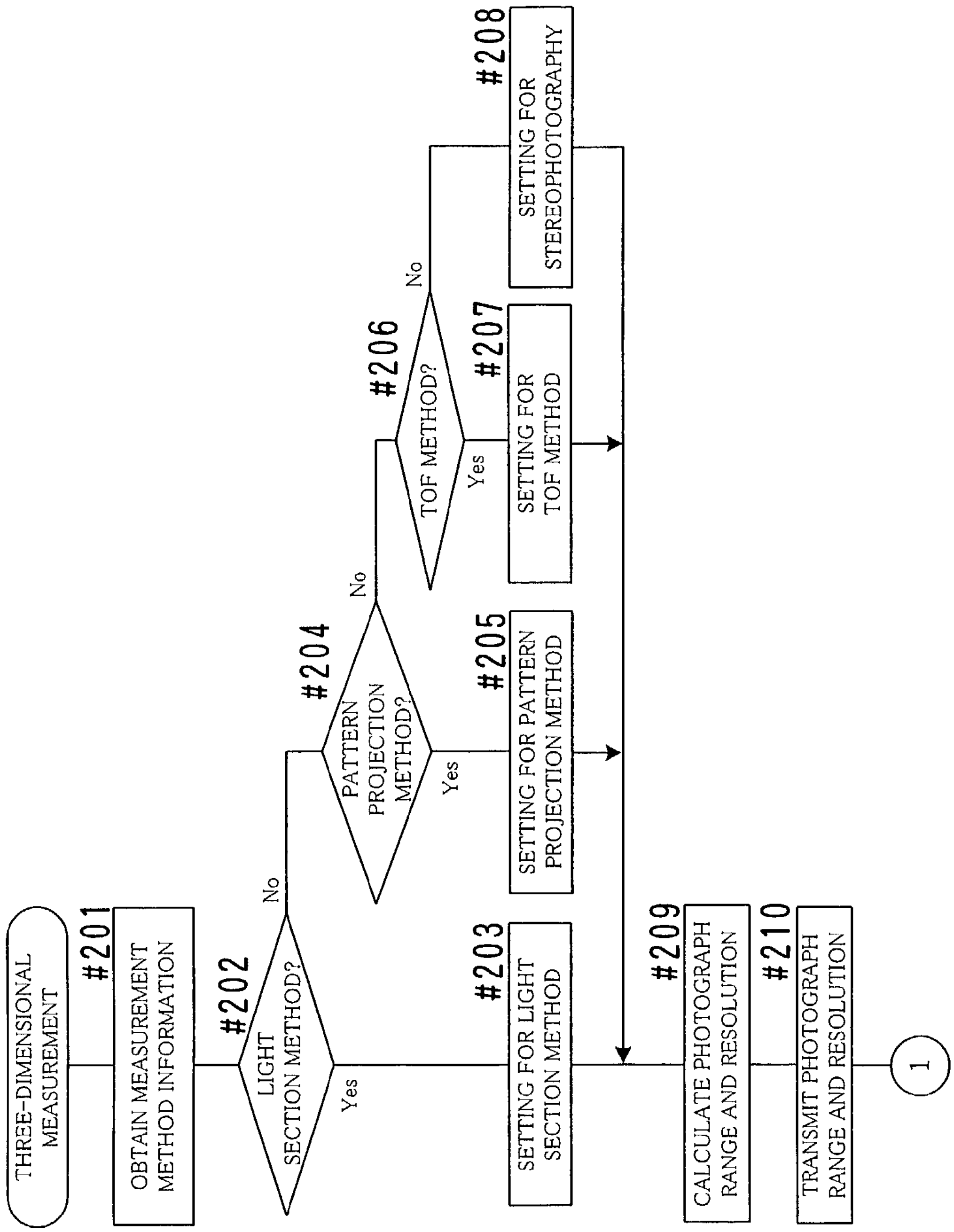
FIG. 6 is a flowchart showing a routine of three-dimensional measurement processing of the digital camera.
Figure 7:
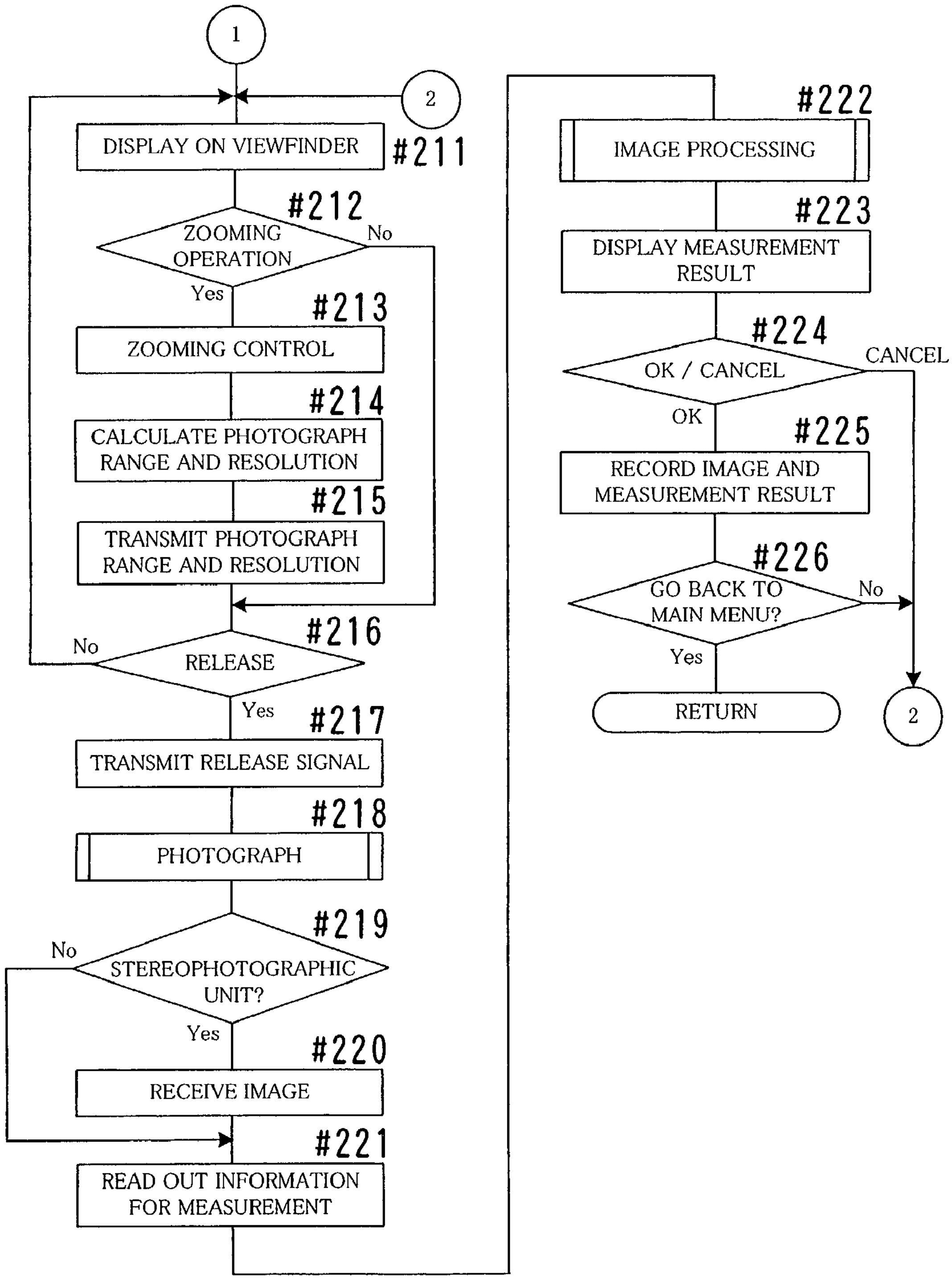
FIG. 7 is a flowchart showing a routine of three-dimensional measurement processing of the digital camera.

FIG. 3 shows a menu picture HG1 for a two-dimensional image, FIG. 4 shows a menu picture HG2 for an image and measurement, FIG. 5 is a main flowchart showing control contents of the second controlling portion 20 of the digital camera 3 and each of FIGS. 6 and 7 is a flowchart showing a routine of three-dimensional measurement processing of the digital camera 3.

As shown in FIG. 5, each of the portions is initialized and supplying power to the auxiliary unit 4 is started (#101). Then, it is checked whether the auxiliary unit 4 is attached or not (#102). For example, a predetermined signal is transmitted to the first controlling portion 40, and it is checked whether a response is received within a predetermined time. After the checking, information is exchanged with each other.

There may be provided a switch or a sensor that responds to the attached or removed state of the auxiliary unit 4 to detect the state of the switch or the sensor. However, in order to enhance reliability, it is preferable to check the communication state with the first controlling portion 40 of the auxiliary unit 4.

Depending on whether the auxiliary unit 4 is attached or not, either the menu picture HG or the menu picture HG2 is displayed on the display portion 18. As shown in FIG. 3, the menu picture HG1 shows an initial menu when the auxiliary unit 4 is not attached to the digital camera 3, and only modes related to a two-dimensional image are displayed.

As shown in FIG. 4, the menu picture HG2 shows an initial menu when the auxiliary unit 4 is attached to the digital camera 3. Modes related to three-dimensional measurement are displayed in addition to the modes shown in the menu picture HG1.

With respect to the menu pictures HG1 and HG2, the buttons, which are provided in the operating portion 17, for moving cursor in the horizontal or the vertical direction are operated to select any one mode, then, the button, which is also provided in the operating portion 17, for confirming the entry is operated to select the mode actually. Next, each of the modes will be described.

In an image playing mode, a recorded two-dimensional image is read out so as to be displayed on the display portion 18. It is possible to change the image to be displayed and to erase the currently displayed image.

In a photographing mode, only the digital camera 3 is used for taking a two-dimensional image in the same manner as a general digital camera.

In a three-dimensional image playing mode, recorded three-dimensional data are read out so as to be displayed on the display portion 18. On this occasion, the distance may be converted into a light and shade display, for example. In addition, the three-dimensional data may be displayed with the corresponding two-dimensional image side-by-side or may be displayed with overlapping therewith.

In a three-dimensional measurement mode (a measurement mode), the digital camera 3 works with the attached auxiliary unit 4 for conducting only three-dimensional measurement.

In a three-dimensional measurement & two-dimensional photographing mode, the digital camera 3 works with the attached auxiliary unit 4 for conducting three-dimensional measurement, and only the digital camera 3 works to take a two-dimensional image.

In accordance with the mode selected in the menu picture HG1 or HG2, the process goes to a processing routine of each of the modes (#106–110). After completing this processing routine, the process goes back to the step of displaying the menu picture HG1 or HG2.

As shown in FIGS. 6 and 7, measurement mode information of the attached auxiliary unit 4 is obtained (#201). Depending on the type of the measurement methods including a light section method, a pattern projection method (a stripe pattern projection method), a TOF method and a stereophotography, a setting operation corresponding to each of the measurement methods is performed (#202–208). More specifically, setting operations for the photograph controlling portion 12 and the image processing portion 21 are performed such that photographing and image processing for three-dimensional measurement depending on the measurement method of the auxiliary unit 4 are conducted at performing a release operation. When the three-dimensional measurement & two-dimensional photographing mode is selected in the menu picture HG2, a setting operation is performed such that a two-dimensional image for display is taken after conducting three-dimensional measurement.

The photograph range and the resolution of the digital camera 3 are calculated (#209), and these parameters are transmitted to the auxiliary unit 4 (#210). The photographing of an object is performed so that the image is displayed on the display portion 18 (#211). Since the photographing is automatically repeated for a short cycle and the display is updated, a moving picture image is made actually.

The "TELE" button or the "WIDE" button as the zooming button is operated, a control signal is transmitted to the lens controlling portion 14 in accordance with the direction for controlling zooming (#212, 213). Electronic zooming is conducted by processing in the image processing portion 21, if necessary. At each time of zooming control, the photograph resolution and the photograph range of the digital camera 3 are calculated so as to transmit these parameters to the auxiliary unit 4 (#214, 215).

It is checked whether the release button is operated or not (#216). When the release button is not operated, the process goes back to Step #211 for updating the finder image. When the release button is operated, a release signal (a measurement starting signal) is transmitted to the auxiliary unit 4 (#217).

An image for three-dimensional measurement is photographed by a photograph method established in Step #203, #205, #207 or #208 mentioned above (#218). The photographed image or data are stored in appropriate memory storage. If the three-dimensional measurement & two-dimensional photographing mode is selected in the menu picture HG2, a two-dimensional image is taken after photographing an image for three-dimensional measurement.

The type of the auxiliary unit 4 is detected once again (#219). When a stereophotographic unit is used as the auxiliary unit 4, image data are imported from the unit (#220). Parameters of the auxiliary unit 4 that are previously memorized in the second controlling portion 20 are read out (#221). These parameters are stored in appropriate memory storage beforehand depending on the photograph range and the photograph resolution of the digital camera 3 and each of the auxiliary units 4. Alternatively, information obtained by the communication in Step #104 mentioned above is memorized in memory storage.

More particularly, in the case of a light section method, the obtained information includes information indicating the relationship between the past time from release and the light projection angle, i.e., angular velocity, the information is used for calculating the light projection angle from the time when a slit light passes. In the case of a pattern projection method, the obtained information includes information indicating the relationship between each order of projected stripes and the light projection angle of the stripe. In the case of a TOF method, the obtained information includes information indicating light emission (exposure) lighting cycle and lighting time. In the case of a stereophotography, the obtained information includes information indicating a line of sight direction of each pixel.

The image for three-dimensional measurement is processed by the established image processing method (#222). If the three-dimensional measurement & two-dimensional photographing mode is selected in the menu picture HG2, the image for three-dimensional measurement is processed prior to processing the two-dimensional image.

Result of the three-dimensional measurement is displayed (#223). The measurement result is displayed as an image in which the distance is expressed as light and shade, i.e., a distance image. When the two-dimensional image is also photographed in Step #218, the two-dimensional image is displayed along with the distance image. For example, the distance image and the two-dimensional image are displayed side-by-side or displayed with being overlapped with each other. Thus, a user can easily confirm the object of the three-dimensional measurement.

Then, an "OK" button and a "CANCEL" button are displayed on the screen of the display portion 18 until the user inputs (#224). After viewing the display, the user inputs "OK" or "CANCEL". For inputting, the user operates the vertical and horizontal buttons, then, operates the confirmation button. When the user inputs "OK", the three-dimensional data obtained by the three-dimensional measurement are recorded as measurement result data (#225). On this occasion, measurement condition information including the two-dimensional image and specification information of the auxiliary unit 4 that was used and bibliographic items including a day and an operator are recorded in connection with the measurement result data.

An inquiry is made to the user in which the process goes back to a main menu or the measurement is continued (#226). If the user designates to return to the main menu, the process goes back to the menu picture HG2. In contrast, if the user designates to continue the measurement, the process goes back to Step #211.

It is possible to transfer image data obtained by photographing to an external device such as a personal computer so that the image processing in Step #222 is performed in the external device.

Figure 8:
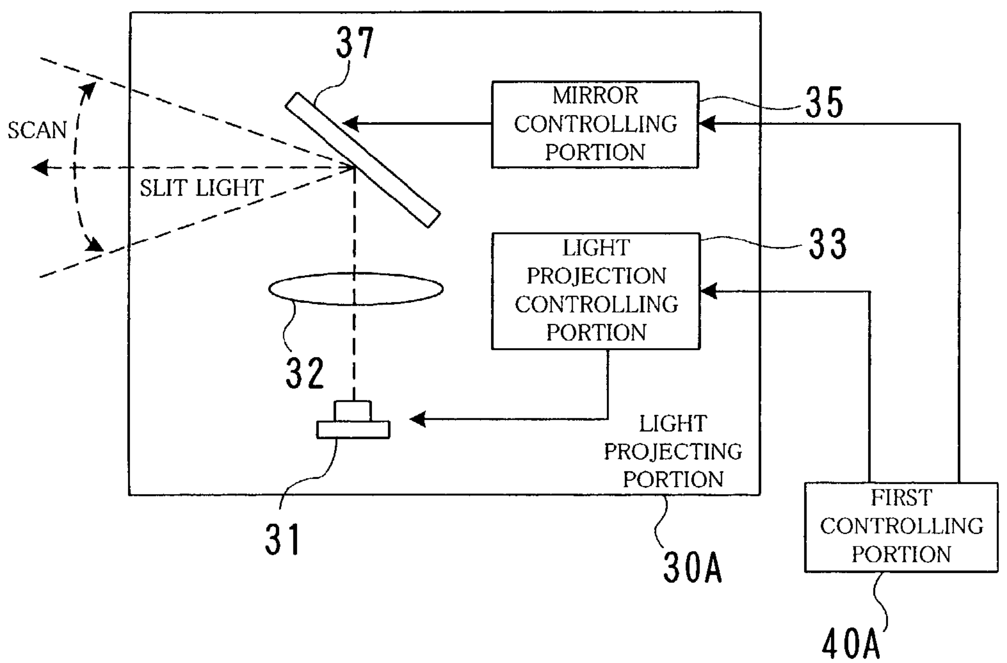
FIG. 8 shows an example of a light projecting portion of a light projection unit for a light section method.

Next, a specific structure example of the auxiliary unit 4 will be described. The stereophotographic unit will be described later. FIG. 8 shows an example of a light projecting portion 30A of the auxiliary unit (the light projection unit for a light section method) 4A.

As shown in FIG. 8, the light projecting portion 30A includes a light source 31, a group of lenses 32, a light projection controlling portion 33, a mirror controlling portion 35 and a mirror 37. A light emitted from the light source 31 becomes a slit light through the group of lenses 32 so that the slit light scans the object using the mirror 37. The slit light reflected by the object is received by the area sensor 11 of the digital camera 3.

In the image processing portion 21, a light receiving position of the reflected light on the area sensor 11 is determined based on the output from the area sensor 11. In accordance with the light receiving position and a projection angle of the slit light, the information of distance away from the object is obtained using a triangulation principle. The projection angle of the slit light, that is, the measurement direction is deflected by the mirror 37 so as to scan predetermined range for the measurement. In order to determine the relationship between the light receiving position of the reflected light and the projection angle of the slit light, it is possible to adopt a method of determining time barycenter of a slit image, a method of determining space barycenter of a slit light or other methods.

Based on the data received from the digital camera 3, a first controlling portion 40A controls light emission timing of the light source 31 through the light projection controlling portion 33 and also controls scanning rate, scanning range and scanning timing of the slit light by rotating the mirror 37 through the mirror controlling portion 35.

Figure 9:
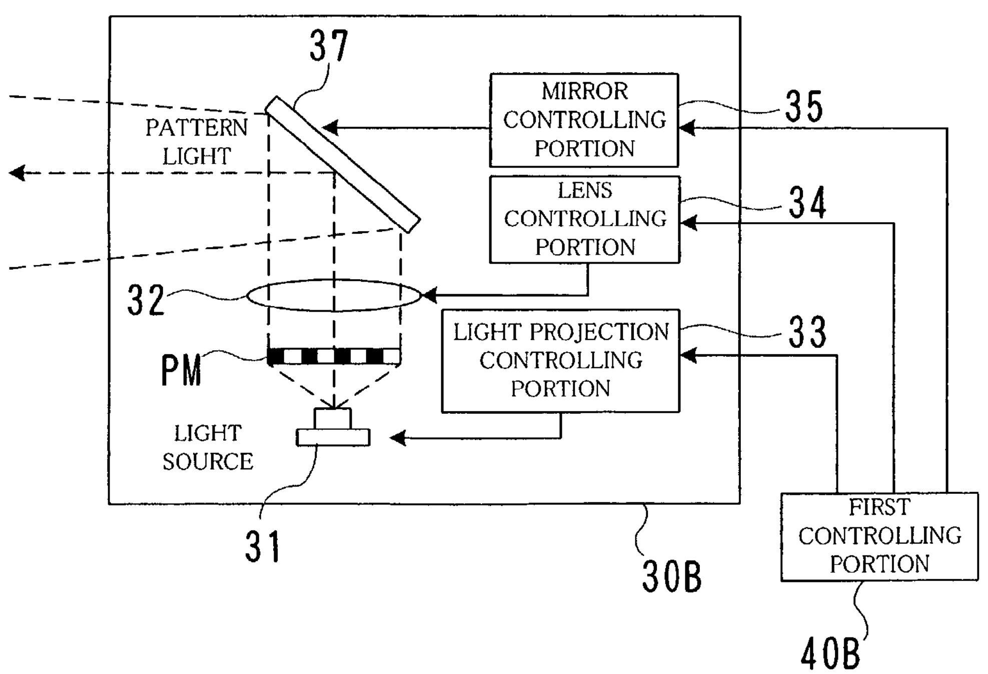
FIG. 9 shows an example of a light projecting portion of a light projection unit for a stripe pattern projection method.

FIG. 9 shows an example of a light projecting portion 30B of the auxiliary unit (a light projection unit for a stripe pattern projection method) 4B. As shown in FIG. 9, the light projecting portion 30B includes the light source 31, a pattern mask PM, the group of lenses 32, the light projection controlling portion 33, a lens controlling portion 34, the mirror controlling portion 35 and the mirror 37.

A light emitted from the light source 31 becomes a pattern light through the pattern mask PM so that the pattern light irradiates the object via the group of lenses 32 and the mirror 37. The pattern light that irradiates the object is photographed by the area sensor 11 of the digital camera 3. In the image processing portion 21, the photographed pattern image is compared to an original pattern, which is identical to the pattern of the pattern mask PM, of the projected pattern light so that three-dimensional measurement for the object is conducted.

Based on the data received from the digital camera 3, a first controlling portion 40B controls light emission timing of the light source 31 through the light projection controlling portion 33, controls irradiation range of the pattern light by the group of lenses 32 through the lens controlling portion 34 and further controls irradiation direction of the pattern light by rotating the mirror 37 through the mirror controlling portion 35.

Figure 10:
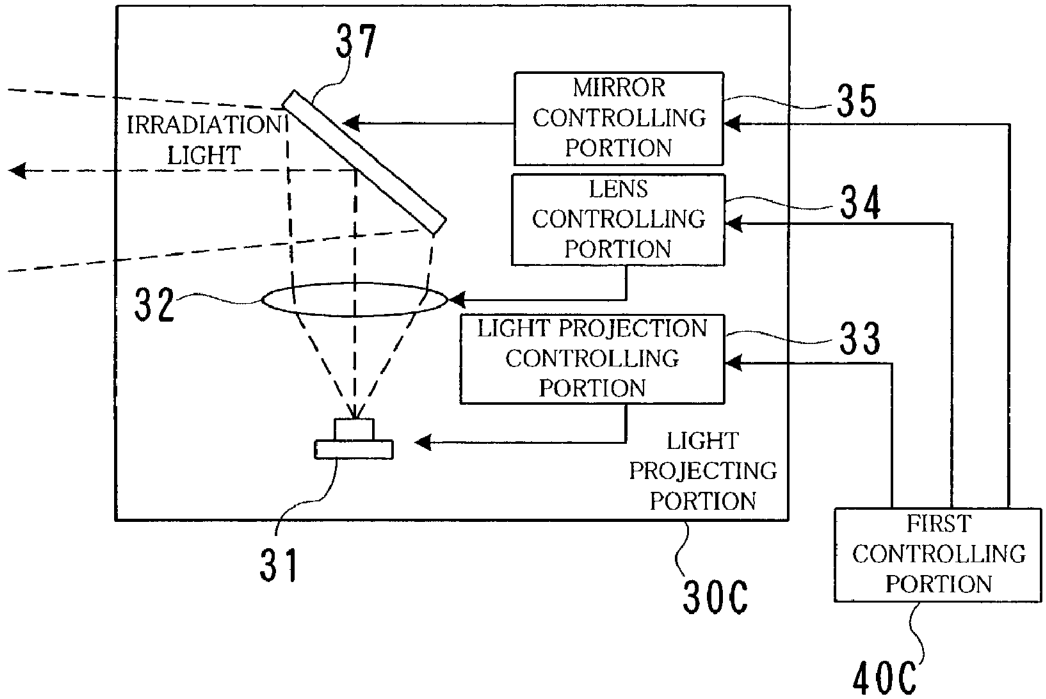
FIG. 10 shows an example of a light projecting portion of a light projection unit for a TOF method.

FIG. 10 shows an example of a light projecting portion 30*c* of the auxiliary unit (a light projection unit for a TOF method) 4C. As shown in FIG. 10, a light emitted from the light source 31 irradiates the object through the group of lenses 32 and the mirror 37. The light reflected by the object is received by the area sensor 11 of the digital camera 3. In the image processing portion 21, a time interval from the light irradiation to the light reception is detected so that three-dimensional measurement for the object is conducted.

Based on the data received from the digital camera 3, a first controlling portion 40C controls light emission timing of the light source 31 through the light projection controlling portion 33, controls irradiation range of the light by the group of lenses 32 through the lens controlling portion 34 and further controls irradiation direction of the light by rotating the mirror 37 through the mirror controlling portion 35.

Figure 11:
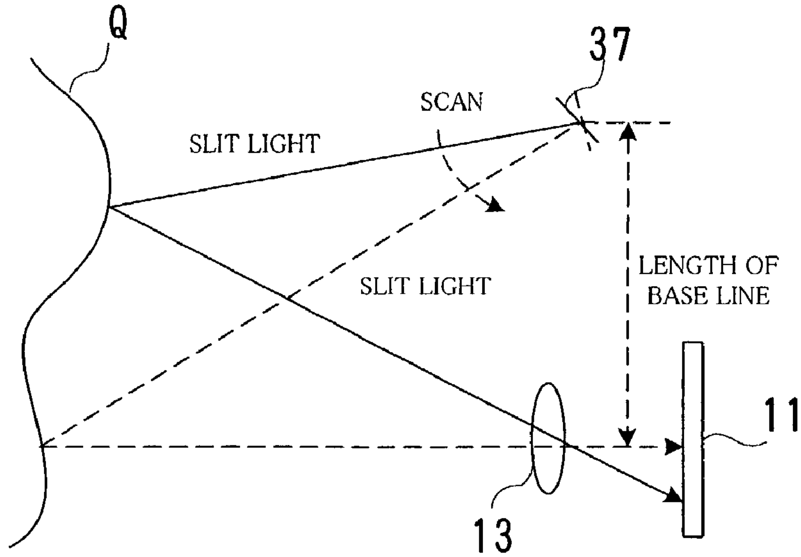
FIG. 11 is a diagram explaining a principle of three-dimensional measurement by a light section method.

Next, image processing for three-dimensional measurement will be described. FIG. 11 is a diagram explaining a principle of three-dimensional measurement by a light section method. As shown in FIG. 11, after the release operation is started, a slit light that is emitted from the auxiliary unit 4 and irradiates the object Q scans the object Q employing the rotation of the mirror 37. After the release operation is started, the area sensor 11 of the digital camera 3 photographs at regular periods during scan of the slit light. The area sensor 11 of the digital camera 3 outputs a frame image at regular intervals after starting the scanning operation. Thereby, it is possible to determine timing when the slit light passes each of points on the object Q (each of pixels on the area sensor 11).

A light projection angle of the slit light that irradiates each of the points on the object Q is obtained from the passage timing. Based on this light projection angle, an incident angle from each of the points on the object Q (each of the pixels of the area sensor 11) to the area sensor 11 and length of base line, the three-dimensional shape of the object Q is calculated by a principle of triangulation distance measurement.

Figure 12:
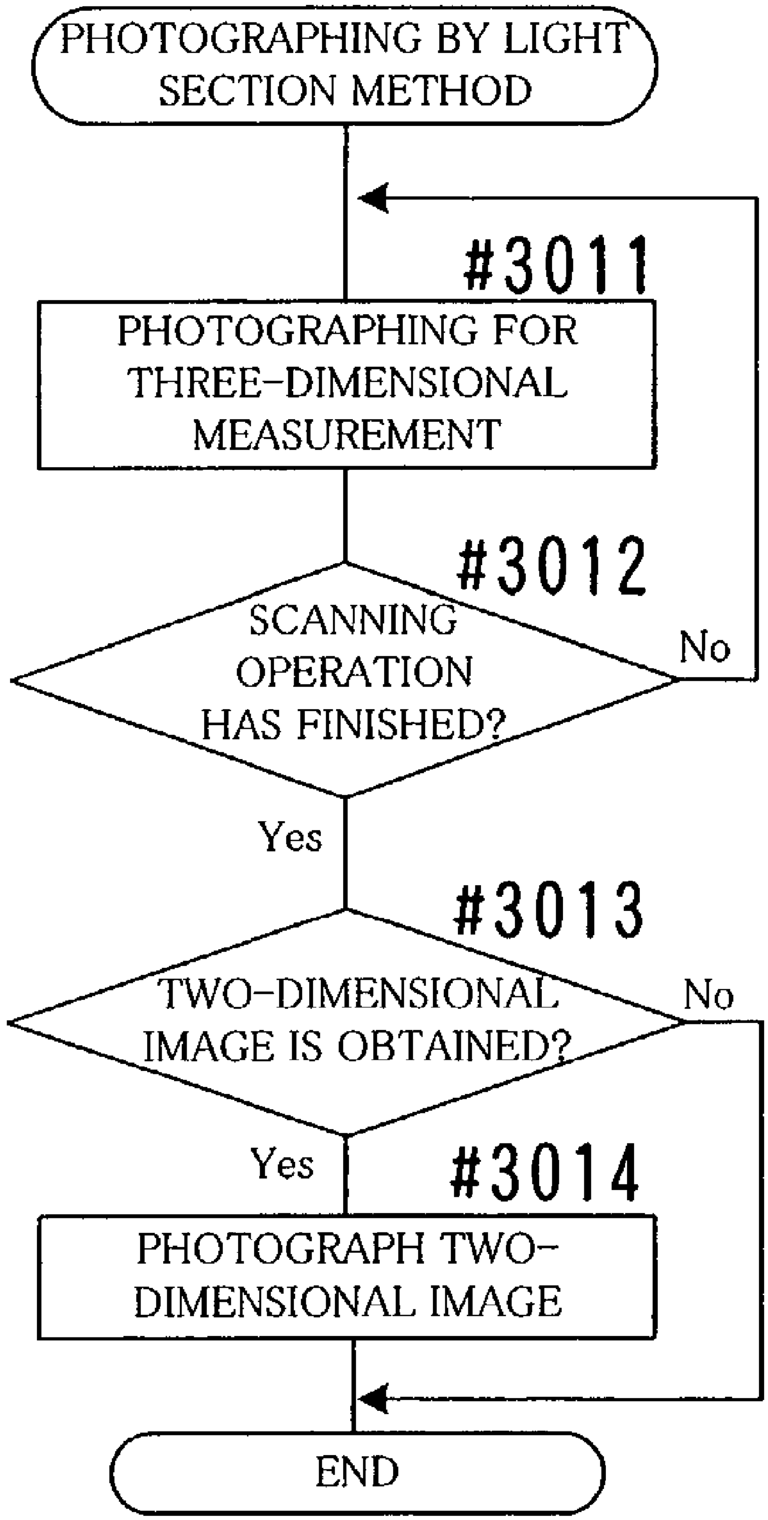
FIG. 12 is a flowchart showing a process of photograph control of three-dimensional measurement by a light section method.
Figure 13:
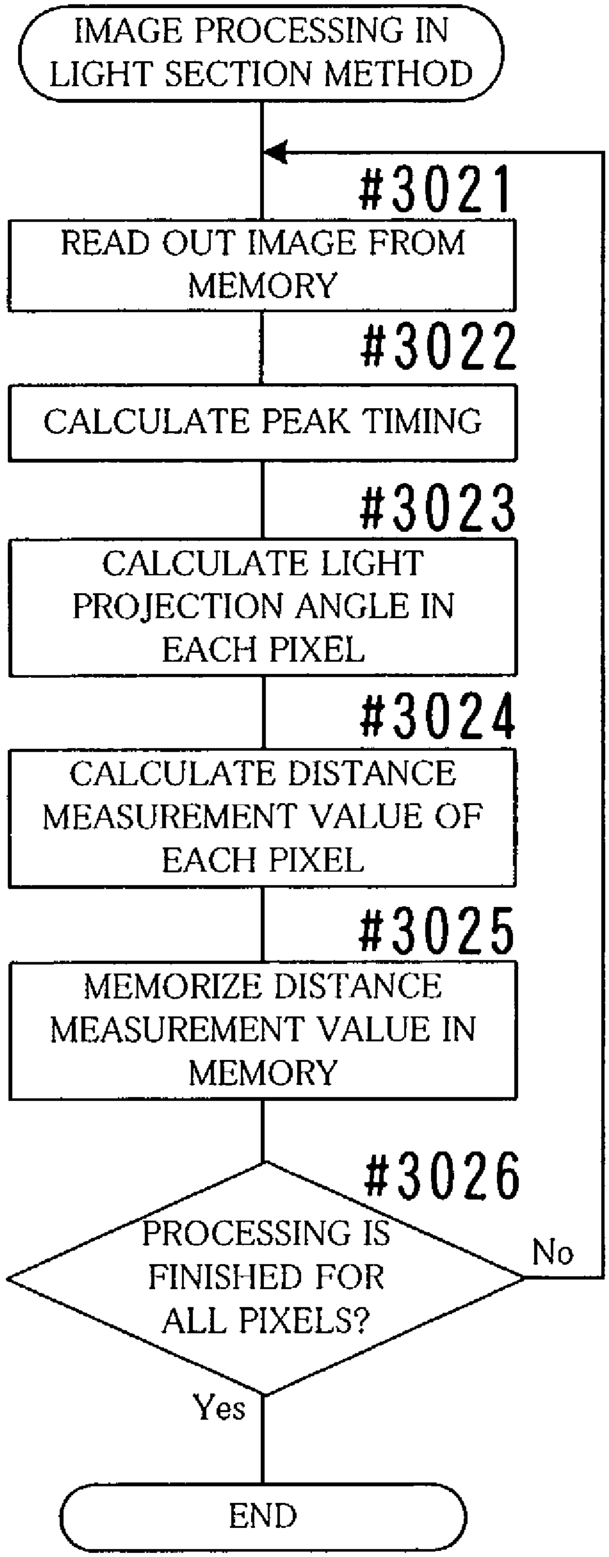
FIG. 13 is a flowchart showing image processing in a light section method.
Figure 14:
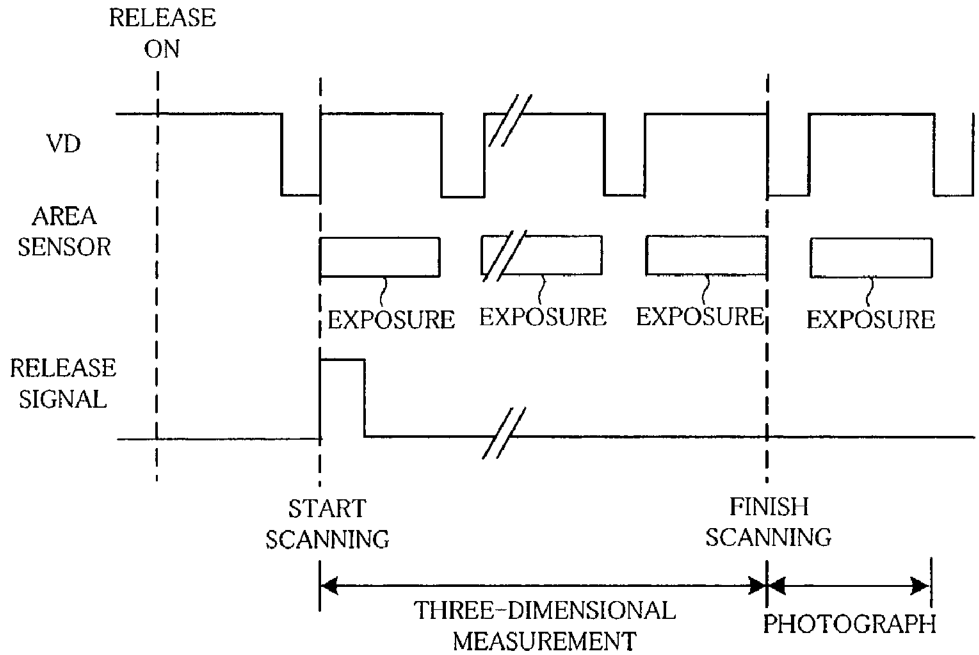
FIG. 14 is a timing chart of photograph control of three-dimensional measurement by a light section method.

FIG. 12 is a flowchart showing a process of photograph control of three-dimensional measurement by a light section method. FIG. 13 is a flowchart showing image processing in a light section method. FIG. 14 is a timing chart of photograph control of three-dimensional measurement by a light section method.

As shown in FIG. 12, when the release button is operated in the operating portion 17, photographing for three-dimensional measurement is conducted (#3011). More specifically, a release signal is transmitted synchronously with a vertical sync signal VD for the area sensor 11 as shown in FIG. 14. After transmitting this release signal, three-dimensional measurement (scan) is started. Exposure is carried out in synchronism with the vertical sync signal VD and each of slit images is taken. Then, data are read out of the area sensor 11 and the image data are written into the memory.

As shown in FIG. 12, a plurality of frame images (images for three-dimensional measurement) is taken and memorized until the scanning operation by the slit light finishes in the auxiliary unit 4 (#3012).

When the three-dimensional measurement & two-dimensional photographing mode is selected in the menu picture HG2, a two-dimensional image is taken and the image data are written into the memory (#3013 and #3014).

With respect to a pixel having an address of "1" of the area sensor 11, all image data that are currently being scanned are read out as shown in FIG. 13 (#3021). Based on the image data that are read out, timing when the maximum luminance is obtained in the pixel address is calculated (#3022). This timing indicates time when the slit light passes the point on the object Q corresponding to this pixel address. In accordance with this passage time, the light projection angle of the slit light on that time is calculated (#3023). Based on the light projection angle, the incident angle (known) and the length of base line (known), a distance measurement value of this pixel address is calculated (#3024). The distance measurement value is memorized in the memory (#3025). The processing mentioned above is carried out for all pixels of the area sensor 11 (#3026).

Figure 15:
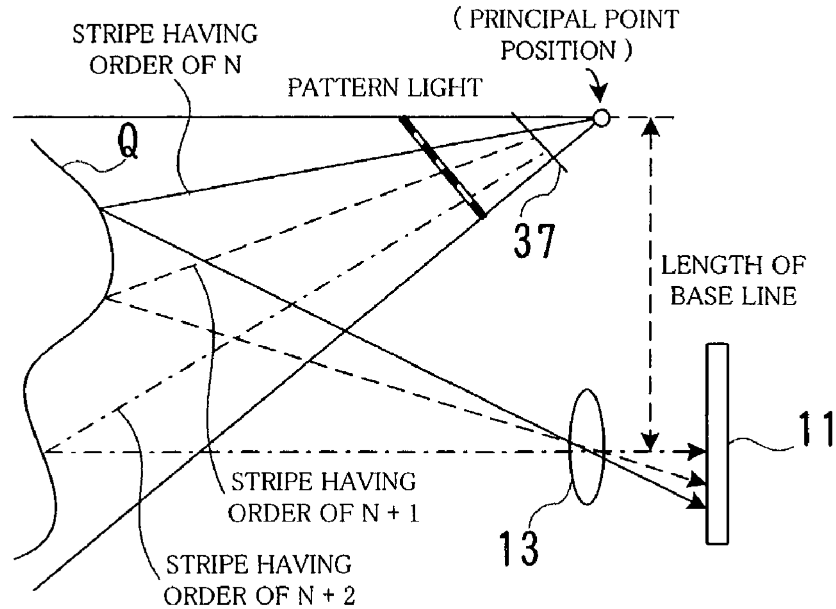
FIG. 15 is a diagram explaining a principle of three-dimensional measurement by a stripe pattern projection method.

FIG. 15 is a diagram explaining a principle of three-dimensional measurement by a stripe pattern projection method. As shown in FIG. 15, at the same time when the release operation is started, a pattern light is emitted to the object Q by the auxiliary unit 4. After the release operation is started, the area sensor 11 of the digital camera 3 photographs so as to output frame images.

The direction of the pattern light projected from the auxiliary unit 4 differs from the incident direction of the pattern light that is projected onto the object Q to be incident on the digital camera 3. Therefore, an image outputted from the area sensor 11 becomes a pattern image modified depending on the surface shape of the object Q. In the photographed pattern image, a stripe having order of N is made a reference so as to detect a stripe position of each order, that is, order of a stripe in each of the pixels of the area sensor 11.

Order of a stripe that is incident on each of the pixels is detected, and thereby, a light projection angle of a stripe that is incident on each of the pixels is calculated. Based on the light projection angle, the incident angle that is known since it is a line of sight direction of each pixel, and the length of base line, the three-dimensional shape of the object Q is calculated employing a principle of triangulation distance measurement.

As the pattern light, there can be used a binary pattern having intensity distribution of a rectangular waveform, a sine pattern having intensity distribution of a sine waveform and a color pattern having color distribution. Additionally, it is possible to adopt a method in which various different patterns are projected and photographed for measurement by plural times of projection and photograph, such as a space coding method or a phase-shift method.

Figure 16:
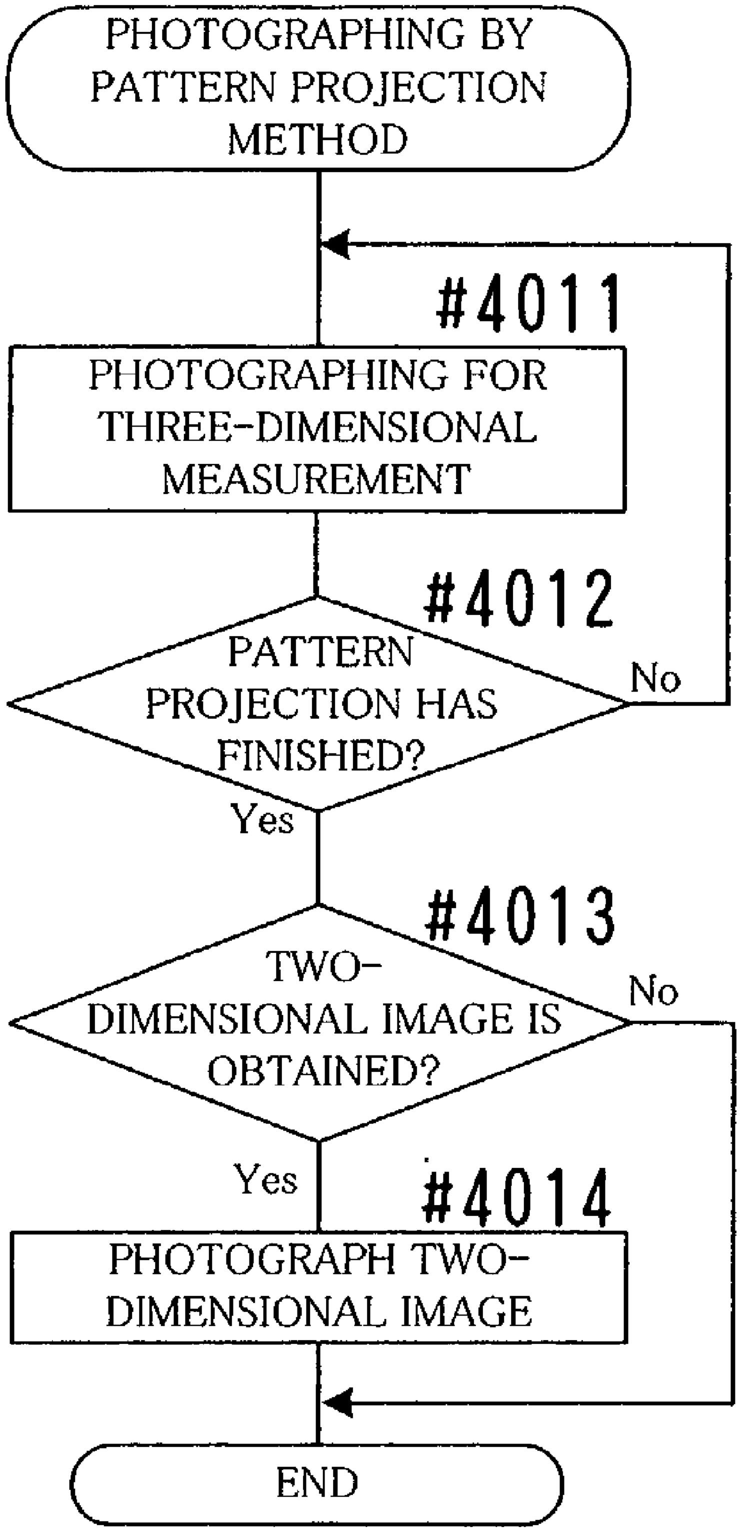
FIG. 16 is a flowchart showing a process of photograph control of three-dimensional measurement by a stripe pattern projection method.
Figure 17:
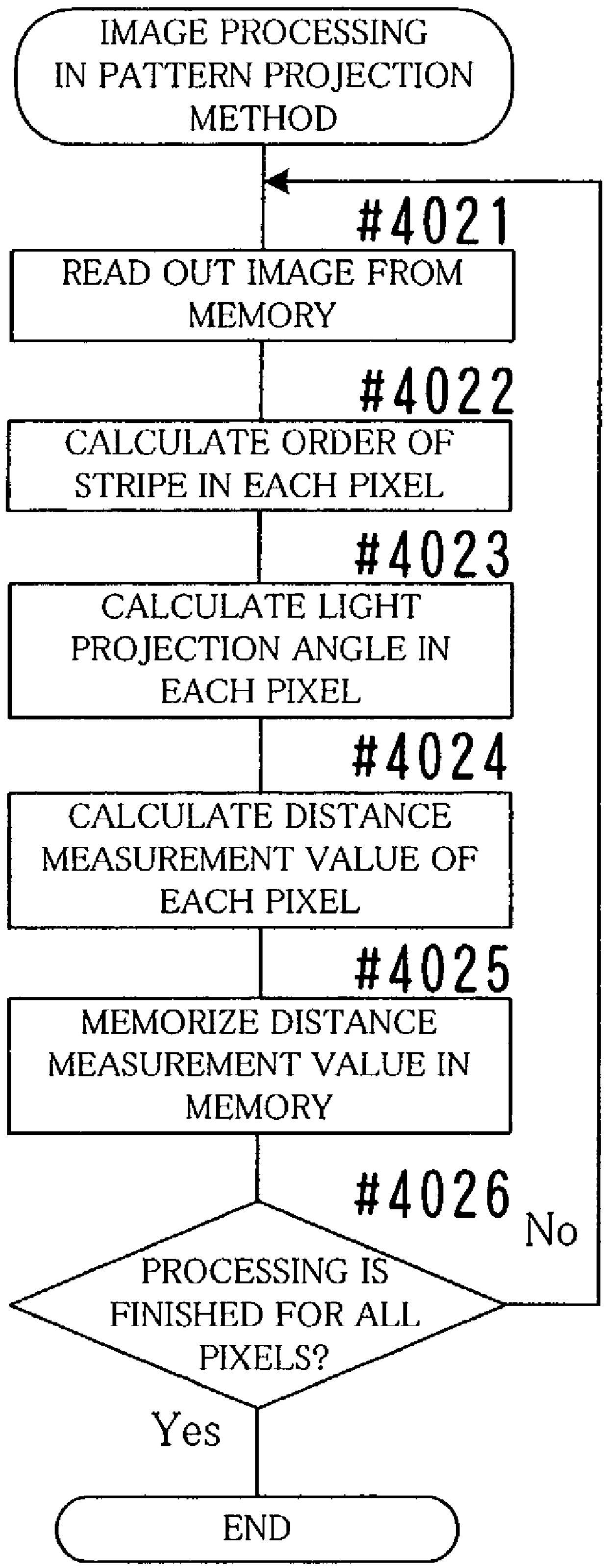
FIG. 17 is a flowchart showing image processing in a stripe pattern projection method.
Figure 18:
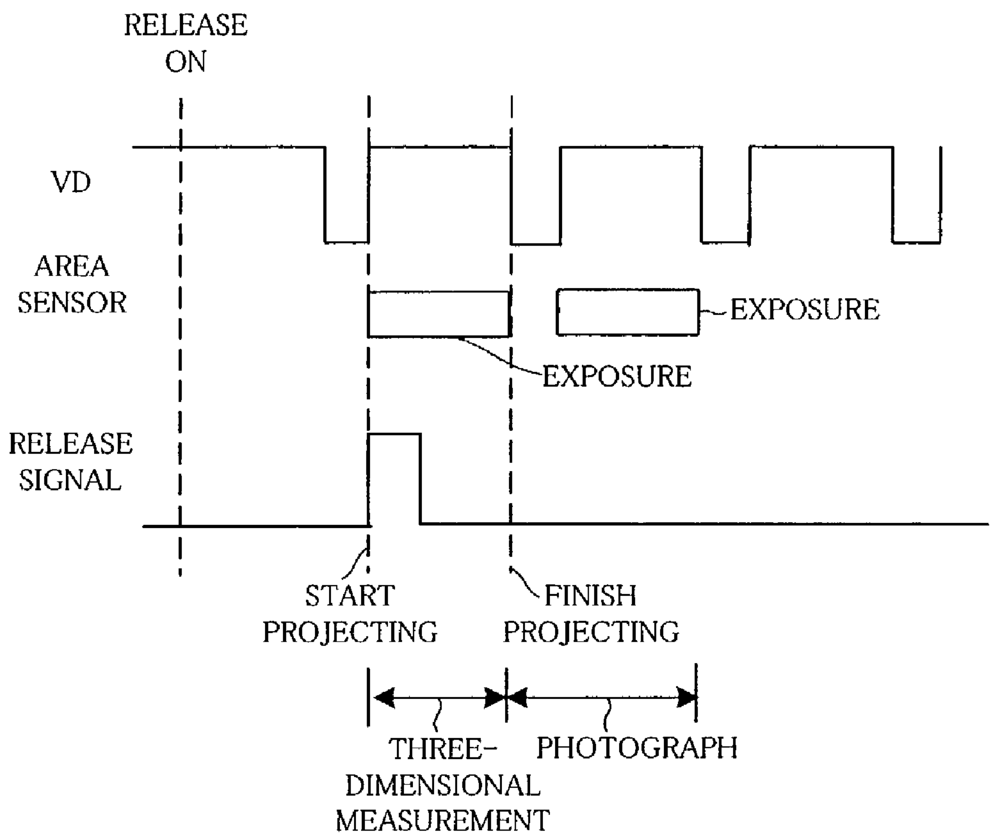
FIG. 18 is a timing chart of photograph control of three-dimensional measurement by a stripe pattern projection method.

FIG. 16 is a flowchart showing a process of photograph control of three-dimensional measurement by a stripe pattern projection method. FIG. 17 is a flowchart showing image processing in a stripe pattern projection method. FIG. 18 is a timing chart of photograph control of three-dimensional measurement by a stripe pattern projection method.

As shown in FIG. 16, when the release button is operated in the operating portion 17, photographing for three-dimensional measurement is conducted (#4011). More specifically, a release signal is transmitted synchronously with a vertical sync signal VD for the area sensor 11 as shown in FIG. 18. After transmitting this release signal, three-dimensional measurement is started. Exposure is carried out in synchronism with the vertical sync signal VD and each of pattern images is taken. Then, data are read out of the area sensor 11 and the image data are written into the memory.

As shown in FIG. 16, in the case of the space coding method or the phase-shift method, a plurality of frame images is taken and memorized until the pattern projection from the auxiliary unit 4 finishes (#4012).

When the three-dimensional measurement & two-dimensional photographing mode is selected in the menu picture HG2, a two-dimensional image is taken and the image data are written into the memory (#4013 and #4014).

As shown in FIG. 17, the image whose pattern is currently being projected is read out (#4021). In accordance with the image data that are read out, order of a stripe that is incident on the pixel address is calculated (#4022). Based on the obtained order, a light projection angle of the incident light on the pixel is calculated (#4023). Based on the light projection angle, the incident angle (known) and the length of base line (known), a distance measurement value of this pixel address is calculated (#4024). The distance measurement value is memorized in the memory (#4025). The processing mentioned above is carried out for all pixels of the area sensor 11 (#4026).

Figure 19:
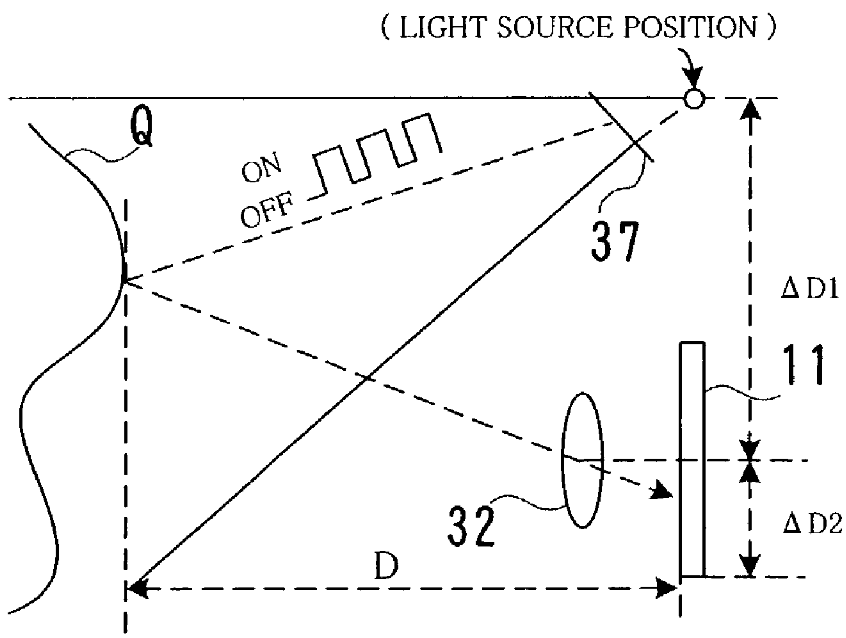
FIG. 19 is a diagram explaining a principle of three-dimensional measurement by a TOF method.
Figure 20:
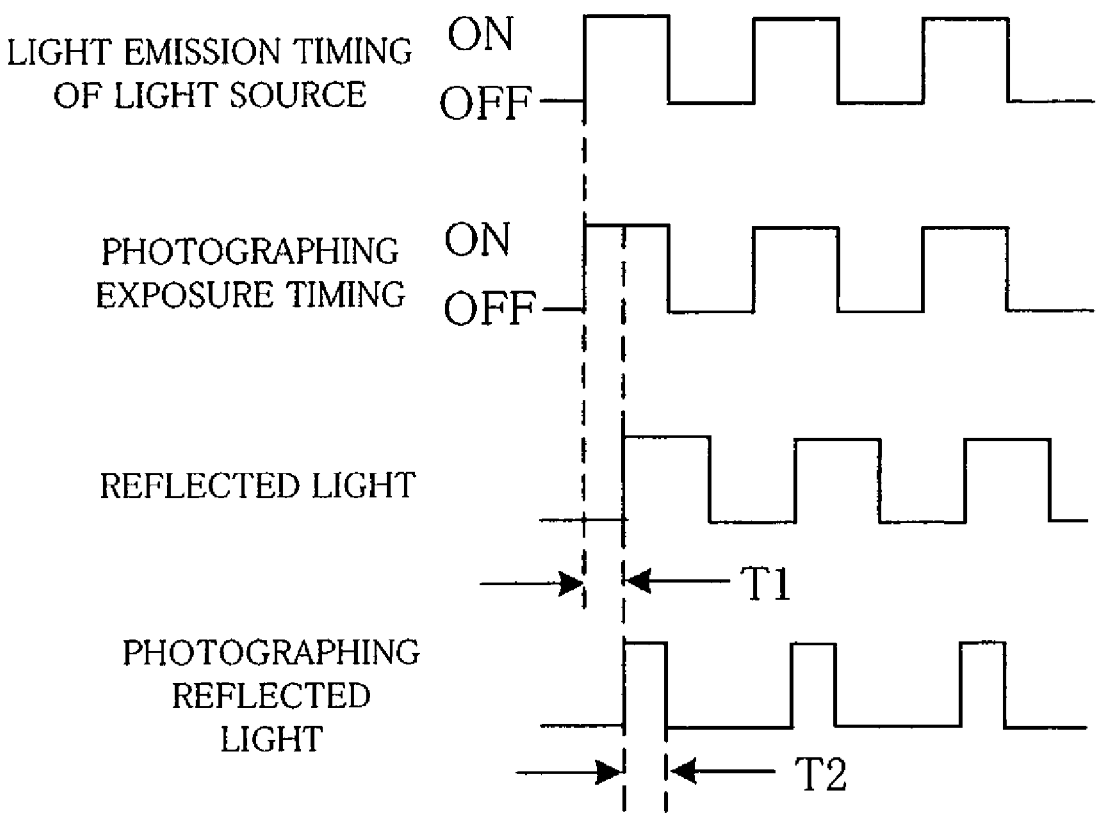
FIG. 20 is a timing chart of measurement by a TOF method.

FIG. 19 is a diagram explaining a principle of three-dimensional measurement by a TOF method. FIG. 20 is a timing chart of measurement by a TOF method. As shown in FIG. 19, at the same time when the release operation is started, pulsed lights are projected to the object Q by the auxiliary unit 4, the pulsed lights repeating ON state and OFF state.

As shown in FIG. 20, after the release operation is started, the area sensor 11 of the digital camera 3 performs the on-off operation of exposure synchronously with the on-off operation of the light source 31. Thereby, the area sensor 11 of the digital camera 3 photographs so as to output frame images. Light emission timing of the light source 31 is synchronized with exposure timing, and thereby, the exposure amount varies depending on optical path length. Therefore, the exposure amount of each of the pixels (a measurement image) indicates the optical path length.

Since this measurement image includes reflectance component of the object Q, photographing is conducted such that only the reflectance component is exposed to obtain a reflectance image after photographing at the timing shown in FIG. 20 in order to remove the reflectance component. Based on the two images, the reflectance component is removed from the measurement image.

Each of distance ΔD1 and distance ΔD2 is much shorter than distance D from the imaging system 1 to the object Q, the distance ΔD1 being distance from the light source 31 of the auxiliary unit 4 to the optical axis of the area sensor 11, and the distance ΔD2 being distance from the optical axis of the area sensor 11 to the end of the area sensor 11. Therefore, a half of the optical path length from the light source 31 to the area sensor 11 through the object Q is the distance away from the object Q in the line of sight direction of each pixel.

Figure 21:
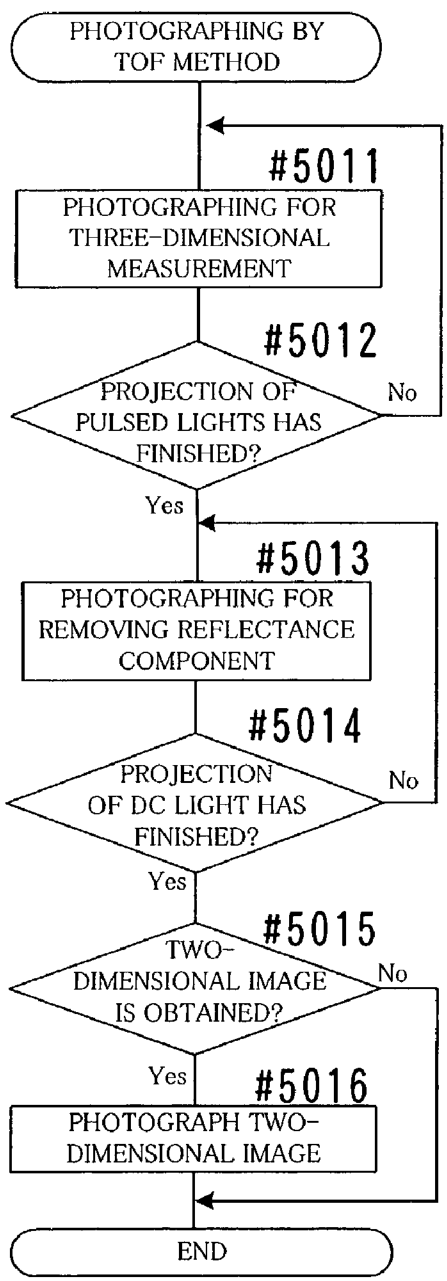
FIG. 21 is a flowchart showing a process of photograph control of three-dimensional measurement by a TOF method.
Figure 22:
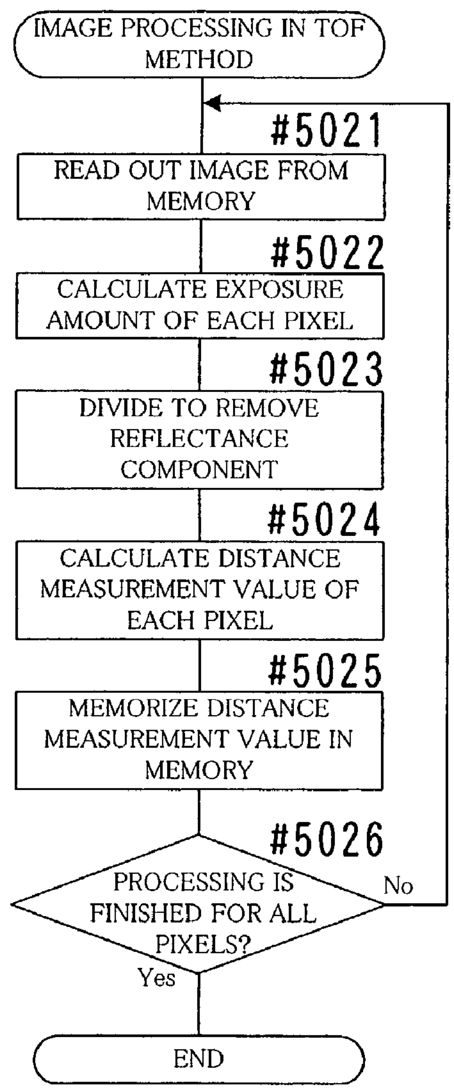
FIG. 22 is a flowchart showing image processing in a TOF method.
Figure 23:
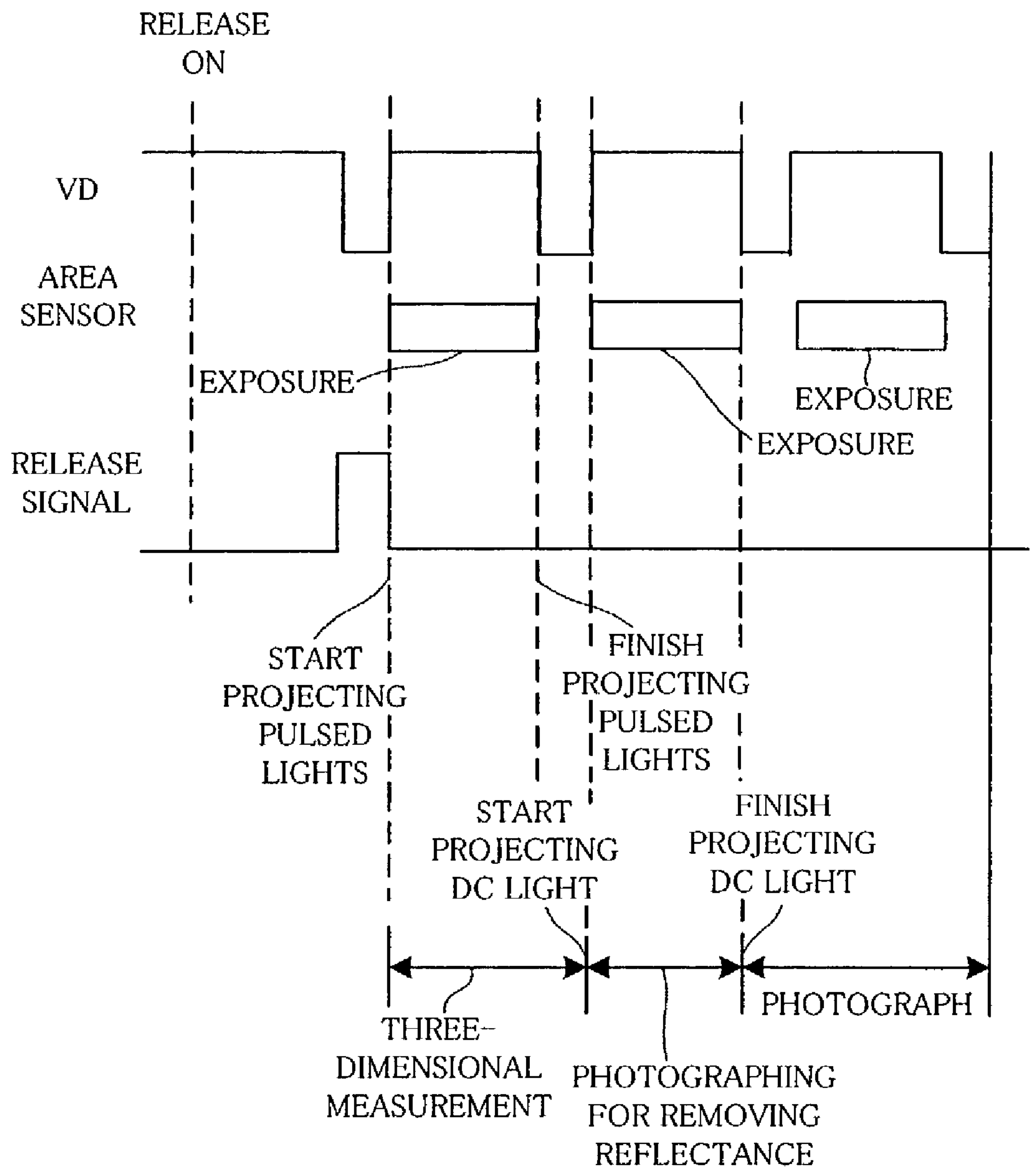
FIG. 23 is a timing chart of photograph control of three-dimensional measurement by a TOF method.

Since an incident angle on each of the pixels is known based on the distance away from the object Q in the line of sight direction of each pixel, distance D away from the object Q is calculated so as to calculate the three-dimensional shape of the object Q. FIG. 21 is a flowchart showing a process of photograph control of three-dimensional measurement by a TOF method. FIG. 22 is a flowchart showing image processing in a TOF method. FIG. 23 is a timing chart of photograph control of three-dimensional measurement by a TOF method.

As shown in FIG. 21, the release button is operated in the operating portion 17, photographing for three-dimensional measurement is conducted (#5011). More specifically, a release signal is transmitted synchronously with a vertical sync signal VD for the area sensor 11 as shown in FIG. 23. Immediately after transmitting this release signal, three-dimensional measurement (projection of pulsed lights) is started. Light emission of the light source 31 and the on-off operation of the exposure are carried out in synchronism with the vertical sync signal VD and each of the pulsed lights is received. Then, data are read out of the area sensor 11 and the image data are written into the memory.

As shown in FIG. 21, a plurality of frame images is taken and memorized until the projection of all the pulsed lights from the auxiliary unit 4 finishes (#5012). After completing the projection of the pulsed lights and the photographing of the frame images, a DC light for removing reflectance is irradiated and exposure is continuously carried out so that the image data of the reflected light component by light projection are photographed and recorded (#5013 and #5014).

When the three-dimensional measurement & two-dimensional photographing mode is selected in the menu picture HG2, a two-dimensional image is taken and the image data are written into the memory storage(#5015 and #5016). It is possible to use photograph data for removing the reflected light as a two-dimensional image for display.

As shown in FIG. 22, the image data on which the pulsed lights are currently being projected are read out (#5021). In accordance with the image data that are read out, the exposure amount of the pixel address is calculated (#5022). The exposure amount of the pulsed light is divided by the exposure amount of the DC light to remove the reflectance component (#5023).

Propagation delay time of the light is calculated from exposure amount of each of pixel addresses so as to calculate the optical path length. At this stage, the optical path is from each of the points on the object Q to each of the pixels through the principal point of the photograph lens. Then, based on the incident angle (known), the distance measurement value of this pixel address is calculated (#5024). The distance measurement value is memorized in the memory (#5025). The processing mentioned above is carried out for all pixels of the area sensor 11 (#5026).

Figure 24:
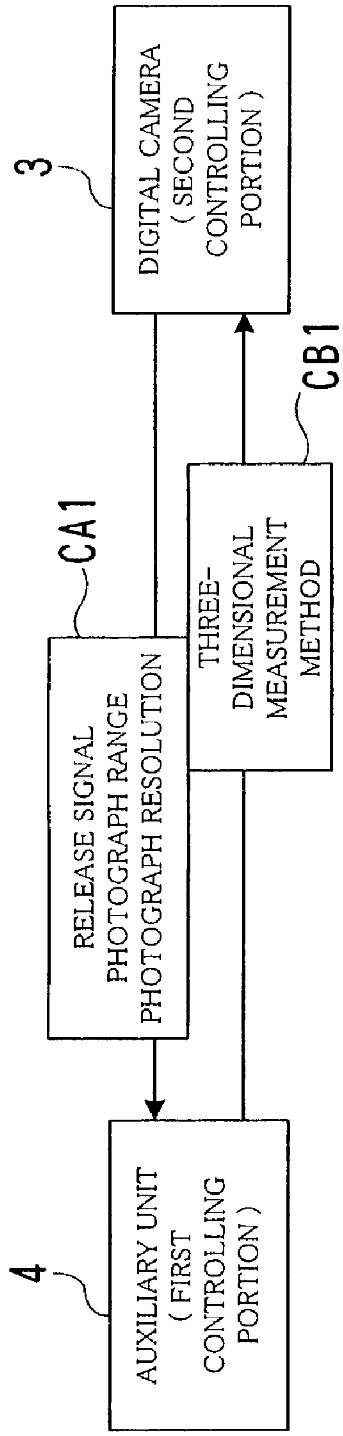
FIG. 24 is a diagram showing an example of a light projection condition and a photograph condition that are communicated between an auxiliary unit and a digital camera.

Communication between the auxiliary unit 4 and the digital camera 3 is described hereinafter. FIG. 24 is a diagram showing an example of a light projection condition and a photograph condition that are communicated between the auxiliary unit 4 and the digital camera 3. The light projection condition and/or the photograph condition are referred to as an "operating condition".

In the case of transmission and reception of the operating conditions, data are written from one of the auxiliary unit 4 and the digital camera 3 into the register of the other, and data are read out of the register of the other, and thereby, communication means therebetween can be realized. However, any other communication means are available as long as data can be transmitted and received between them using the means.

As shown in FIG. 24, "CA" denotes the operating condition transmitted from the digital camera 3 to the auxiliary unit 4, while "CB" denotes the operating condition transmitted from the auxiliary unit 4 to the digital camera 3.

The operating condition CA1 includes the release signal that is a photograph starting signal of the digital camera 3, the photograph range and the photograph resolution. The operating condition CB1 includes data indicating the three-dimensional measurement method.

The photograph range of the digital camera 3 is usually set in such a manner to cover the light projection range of the auxiliary unit 4. In this case, time required for three-dimensional measurement is short. To the contrary, when the light projection range of the auxiliary unit 4 is set in such a manner to cover the photograph range of the digital camera 3, three-dimensional measurement speed is reduced, but three-dimensional measurement precision is improved.

The photograph resolution of the digital camera 3 may be set higher than the light projection resolution of the auxiliary unit 4. To the contrary, the light projection resolution of the auxiliary unit 4 may be set higher than the photograph resolution of the digital camera 3.

Next, other examples of the operating conditions CA and CB will be described. The operating condition CA2 includes the light projection range and the light projection resolution of the auxiliary unit 4, and the release signal. The operating condition CB2 includes data indicating the three-dimensional measurement method.

The operating condition CA3 is control parameters including the release signal and the focal distance of the digital camera 3. The operating condition CB3 includes data indicating the three-dimensional measurement method. The operating condition CA4 is control parameters including the release signal and the swing of the mirror of the auxiliary unit 4. The operating condition CB4 includes data indicating the three-dimensional measurement method.

The operating condition CA5 includes the release signal and the operating condition CB5 includes data indicating the three-dimensional measurement method, and the light projection range as well as the light projection resolution of the auxiliary unit 4. The operating condition CA6 includes the release signal and the operating condition CB6 includes data indicating the three-dimensional measurement method, and the photograph range as well as the photograph resolution of the digital camera 3.

The operating condition CA7 includes the release signal and the operating condition CB7 is control parameters including data indicating the three-dimensional measurement method and the swing of the mirror of the auxiliary unit 4.

The operating condition CA8 includes the release signal and the operating condition CB8 is control parameters including data indicating the three-dimensional measurement method and the focal distance of the digital camera 3. Other than those above, a system can be realized in which at least one of the auxiliary unit 4 and the digital camera 3 transmits at least either the photograph condition or the light projection condition so as to be received by the other. Under such a system, the receiving end can perform control processing in accordance with the received data so that three-dimensional measurement is conducted.

Figure 25:
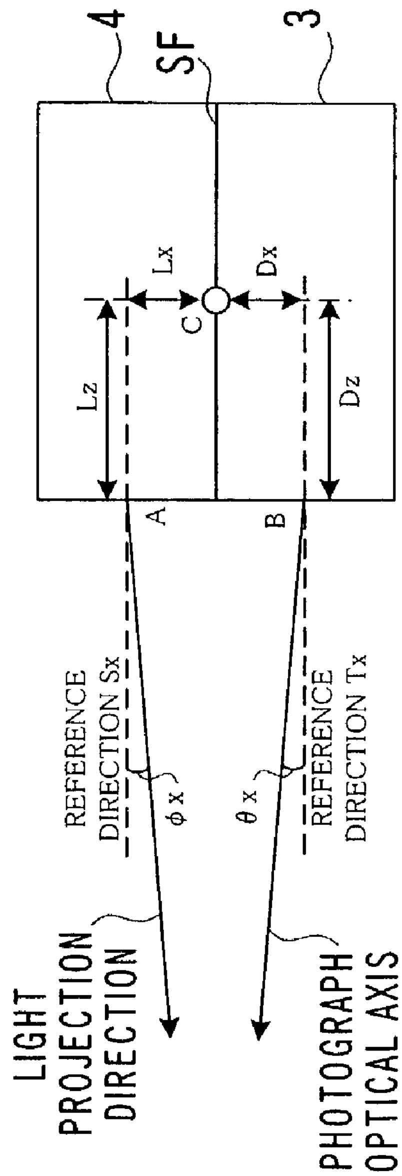
FIG. 25 is a diagram explaining reference directions of a digital camera and an auxiliary unit.

The light projection condition and the photograph condition are described hereinafter. FIG. 25 is a diagram explaining reference directions of the digital camera 3 and the auxiliary unit 4.

As shown in FIG. 25, both the reference direction Tx of the digital camera 3 and the reference direction Sx of the auxiliary unit 4 are parallel with a mounting plane SF, which is a plane formed such that the digital camera 3 and the auxiliary unit 4 come into contact with each other. The reference directions Sx and Tx pass reference points A and B, respectively. A mounting reference point C lies around the center of the mounting plane SF.

The distance from the mounting reference point C to the reference point A in the reference direction Sx for light projection is denoted by Lx, Lz and Ly. Ly is the direction vertical to the paper on which the drawing is illustrated. The distance from the mounting reference point C to the reference point B in the reference direction Tx for photographing is denoted by Dx, Dz and Dy. Dy is the direction vertical to the paper on which the drawing is illustrated.

The respective directions vertical to the reference directions Sx and Tx, i.e., reference directions Sy and Ty that are the directions vertical to the paper on which the drawing is illustrated are predetermined and identical directions. The reference directions Sy and Ty pass the reference points A and B, respectively.

The angle between the light projection direction and the reference direction Sx is denoted by $\phi x$, and the angle between the light projection direction and the reference direction Sy is denoted by $\phi y$. The angle between the photograph optical axis and the reference direction Tx is denoted by θx, and the angle between the photograph optical axis and the reference direction Ty is denoted by θy. The angles ϕx, ϕy, θx and θy are used as the reference so as to indicate the light projection range of the auxiliary unit 4 and the photograph range of the digital camera 3.

Thus, the auxiliary unit 4 and the digital camera 3 communicate their respective light projection conditions or photograph conditions to each other. Thereby, each of the auxiliary unit 4 and the digital camera 3 performs a setting operation according to the received condition so as to conduct three-dimensional measurement. In the digital camera 3, the light projection condition obtained from the auxiliary unit 4 and the photograph condition of the digital camera 3 are written into the recording medium KB together with the measurement result data.

The data memorized in the recording medium KB are read out by a disk drive of an appropriate external computer. Based on the measurement result data, the light projection conditions and the photograph conditions all of which are read from the recording medium KB, the computer conducts processing of pasting the two-dimensional image into the three-dimensional data to display a three-dimensional image on the display device.

In the imaging system 1, unprocessed data obtained by the three-dimensional measurement, or data that are subjected to partial processing may be written into the recording medium KB without calculating the three-dimensional data. In this case, the external computer calculates the three-dimensional data based on the data memorized in the recording medium KB. By this method, the load of the digital camera 3 is reduced, and thereby, ensuring that inexpensive system can be realized. A personal computer can be used as such a computer, for example.

Figure 26:
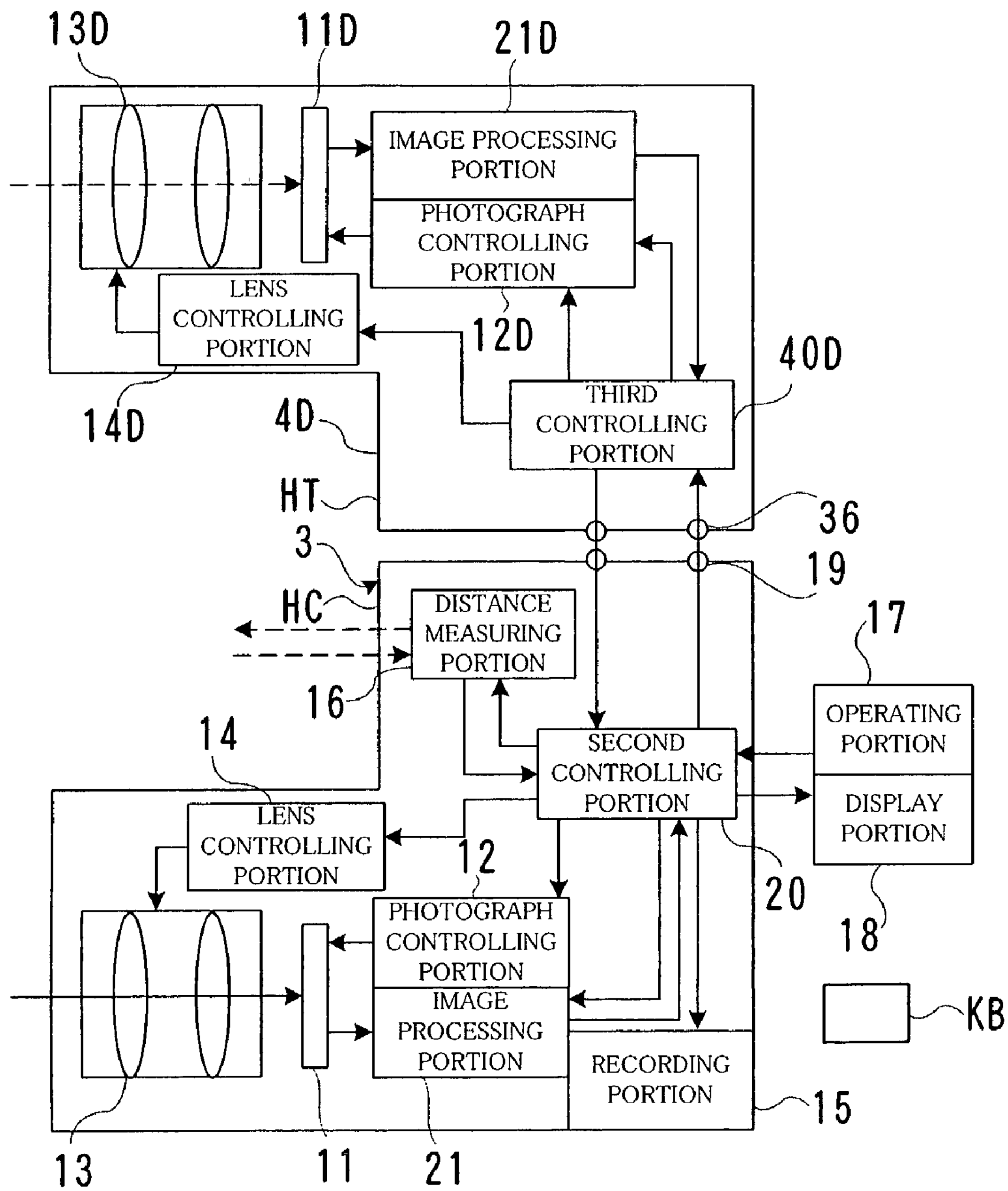
FIG. 26 is a diagram showing a schematic structure in which a stereophotographic unit is installed.
Figure 27:
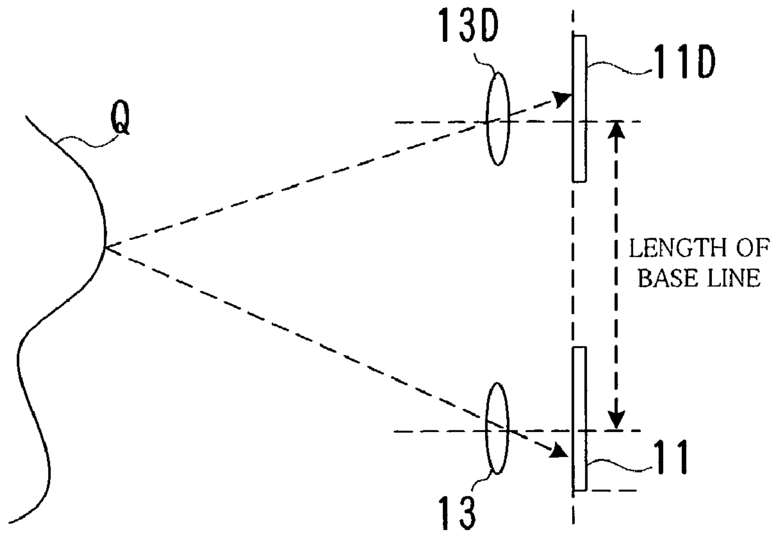
FIG. 27 is a diagram explaining a principle of three-dimensional measurement by a stereophotography.

Next, the stereophotographic unit will be described. FIG. 26 is a diagram showing a schematic structure of an imaging system 1D in which the auxiliary unit 4D (the stereophotographic unit) is installed. FIG. 27 is a diagram explaining a principle of three-dimensional measurement by a stereophotography.

As shown in FIG. 26, the auxiliary unit 4D includes an area sensor 11D, a photograph controlling portion 12D, a group of lenses 13D, a lens controlling portion 14D, a connector 36, a third controlling portion 40D and an image processing portion 21D. These elements are incorporated inside the body housing HT or on the surface thereof.

When the release button of the digital camera 3 is operated, each of the area sensors 11 and 11D takes an image of the object Q simultaneously. The image taken by the area sensor 11D is temporarily stored in the image processing portion 21D, and then is transmitted to the digital camera 3 via the third controlling portion 40D. Thus, the digital camera 3 can obtain two images with parallax with respect to the object Q.

As shown in FIG. 27, concerning the two images, each of pixel addresses of points corresponding to the identical point on the object Q (corresponding points) is determined. With respect to each of the corresponding points, a principle of triangulation distance measurement is used to calculate three-dimensional data of the object Q. In the image processing portion 21, the image obtained by the digital camera 3 is made a reference image, and the image obtained by the auxiliary unit 4D is made a referred image, and then each of pixel addresses in the referred image corresponding to each of pixels in the reference image is detected.

Thus, each of measurement distance values indicating distance away from each of the points on the object Q in each pixel of the reference image is calculated. The generated three-dimensional shape data are recorded in the recording portion 15. The photograph range and the photograph resolution of the auxiliary unit 4D correspond to the light projection range and the light projection resolution of the auxiliary units 4A–4C, respectively. The photograph range depends on the photograph magnification of the group of lenses 13D, the size of the area sensor 11D and others. The photograph resolution depends on the number of pixels of the area sensor 11D, the parameters of the image processing portion 21D and others.

Figure 28:
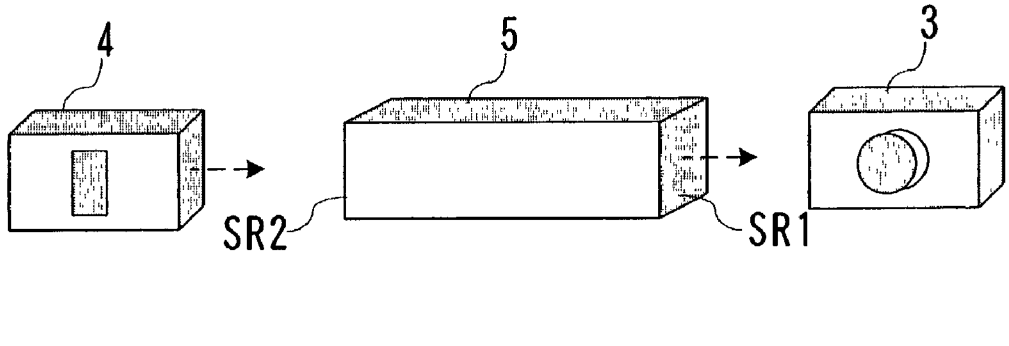
FIG. 28 is a diagram showing a structure in which base line is increased in three-dimensional measurement of an imaging system.

FIG. 28 is a diagram showing a structure in which base line is increased in three-dimensional measurement of the imaging system 1. According to the imaging system 1 described above, the auxiliary unit 4 is directly attached to the mounting plane SF of the digital camera 3. Therefore, if the distance between the imaging system 1 and the object Q is long, the length of the base line may be insufficient for three-dimensional measurement. In order to increase the length of the base line, an interconnection member 5 is provided between the digital camera 3 and the auxiliary unit 4, as shown in FIG. 28.

In FIG. 28, the interconnection member 5 is a hollow rectangular parallelepiped. Outer surfaces thereof are removable surfaces SR1 and SR2 that are parallel to each other. The removable surfaces SR1 and SR2 are provided with respective connectors that are electrically connected to each other. Each of the removable surfaces SR1 and SR2 can be removably attached to each of the digital camera 3 and the auxiliary unit 4. When the digital camera 3 and the auxiliary unit 4 are attached to the removable surfaces SR1 and SR2, electrical connection is made between the connectors 19 and 36.

The interconnection member 5 is used so that the length of the base line is increased by length corresponding to the distance between the removable surfaces SR1 and SR2. Thereby, three-dimensional measurement with higher degree of precision becomes possible.

According to the embodiment described above, various types of the auxiliary units 4 can be attached to the digital camera 3. However, it is possible to attach only one specific auxiliary unit 4 to the digital camera 3. In such a case, three-dimensional measurement is conducted by a single fixed method.

In this case, the digital camera 3 is not required to detect the measurement method of the auxiliary unit 4, and therefore communication therebetween is simplified. When parameters including a measurable angle of view and a resolution of the auxiliary unit 4 to be attached are constant, it is unnecessary to transmit these parameters from the auxiliary unit 4 to the digital camera 3. Accordingly, communication therebetween is further simplified.

According to the embodiment described above, a user selects an operational mode in the menu picture HG2. However, when the auxiliary unit 4 is attached to the digital camera 3, the digital camera 3 may detect the operational mode so as to automatically set a three-dimensional measurement mode or a three-dimensional measurement & two-dimensional photographing mode as an initial value. In this case, when a mode for three-dimensional measurement is set, the digital camera 3 is under a waiting condition for the release operation.

According to the embodiment described above, three-dimensional data are calculated by the processing in the image processing portion 21 based on the data obtained from three-dimensional measurement. In lieu of the processing in the image processing portion 21, an appropriate program can be stored in the second controlling portion 20 and the program can be executed for calculating three-dimensional data.

According to the embodiment described above, a photograph condition is communicated between the digital camera 3 and the auxiliary unit 4 and the photograph condition is memorized in the recording medium KB. In lieu of the photograph condition, internal parameters capable of specifying the photograph condition may be communicated, such parameters including lens focal distance, the number of pixels in the area sensor, the size of the area sensor, for example. Similarly, in lieu of a light projection condition, internal parameters capable of specifying the light projection condition may be communicated, such parameters including the swing of the mirror, the swing speed of the mirror, lens focal distance, the number of pixels in the area sensor, the size of the area sensor, for example.

When a light projection condition and/or a photograph condition are fixed, the fixed information may be previously inputted into an external computer for setting, instead of being memorized in the recording portion 15.

As a three-dimensional measurement method of the auxiliary unit 4, a combined method of a pattern projection method and a stereophotography, or other methods can be used. The auxiliary unit 4 may be provided with a recording portion. In such a case, the recording portion may memorize three-dimensional data and a light projection condition. The recording portion may also memorize data such as a two-dimensional image and a photograph condition.

In the imaging system 1 described above, in lieu of the digital camera 3, a movie camera that can take a movie image can be employed. The entire or a part of the structure, the shape, the dimension, the number, the material of the digital camera 3, the auxiliary unit 4 and the imaging system 1, the contents or the order of the process or the operation can be modified within the scope of the present invention.

According to the present invention, it is possible to provide an imaging system in which a two-dimensional photographing device and a unit for three-dimensional measurement are removably attached to each other, so that the system can be easily used for taking a two-dimensional image and for measuring three-dimensional data.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An imaging system for conducting three-dimensional measurement of an object and taking a two-dimensional image of the object, the system comprising:

a photographing device; and a three-dimensional measurement auxiliary unit formed in a housing provided independently of the photographing device to be removably attached to the photographing device, the photographing device being configured so as to take a two-dimensional image without the three-dimensional measurement auxiliary unit, and to function as a light receiving portion in three-dimensional measurement so as to conduct three-dimensional measurement in cooperation with the attached three-dimensional measurement auxiliary unit; and wherein the three-dimensional measurement auxiliary unit is structured so as to transmit measurement mode information indicating a three-dimensional measurement method to the photographing device, and the photographing device selects an operational mode based on the measurement mode information transmitted from the attached three-dimensional measurement auxiliary unit to conduct three-dimensional measurement.

2. The photographing device according to claim 1, wherein the photographing device is configured so as to select and perform any one of a photographing mode for taking a two-dimensional image and a measurement mode for conducting three-dimensional measurement by the measurement method based on the measurement mode information transmitted from the three-dimensional measurement auxiliary unit, and when the three-dimensional measurement auxiliary unit is attached to the photographing device, the measurement mode is set as an initial value.

3. The imaging system according to claim 1, wherein the photographing device is a digital camera for obtaining a still image of the object as image data by an area sensor provided in the photographing device.

4. The imaging system according to claim 1, wherein the three-dimensional measurement auxiliary unit is an auxiliary unit for a light section method.

5. The imaging system according to claim 1, wherein the three-dimensional measurement auxiliary unit is an auxiliary unit for a stripe analysis method.

6. The imaging system according to claim 1, wherein the three-dimensional measurement auxiliary unit is an auxiliary unit for conducting three-dimensional measurement by a TOF method.

7. The imaging system according to claim 1, wherein the three-dimensional measurement auxiliary unit is an auxiliary unit for conducting three-dimensional measurement by a stereophotography.

8. A photographing device comprising:

a detachable three-dimensional measurement auxiliary unit, the photographing device being configured to take a two-dimensional image without the three-dimensional measurement auxiliary unit, and to function as a light receiving portion in three-dimensional measurement to conduct three-dimensional measurement in cooperation with the three-dimensional measurement auxiliary unit when the three-dimensional measurement auxiliary unit is attached to the photographing device, the photographing device being further configured to be connected to a plurality of different types of three-dimensional measurement auxiliary units and to perform three-dimensional measurement processing depending on the respective type of three-dimensional measurement auxiliary unit.

9. The photographing device according to claim 8, wherein the photographing device is configured to select and perform any one of a photographing mode for taking a two-dimensional image and a measurement mode for conducting three-dimensional measurement by a measurement method based on measurement mode information transmitted from the three-dimensional measurement auxiliary unit.

10. The photographing device according to claim 8, wherein the three-dimensional measurement auxiliary unit is an auxiliary unit for a light section method.

11. The photographing device according to claim 8, wherein the three-dimensional measurement auxiliary unit is an auxiliary unit for a stripe analysis method.

12. The photographing device according to claim 8, wherein the three-dimensional measurement auxiliary unit is an auxiliary unit for conducting three-dimensional measurement by a TOP method.

13. The photographing device according to claim 8, wherein the three-dimensional measurement auxiliary unit is an auxiliary unit for conducting three-dimensional measurement by a stereophotography.

14. A three-dimensional measurement auxiliary unit removably attached to a photographing device, the unit comprising:

a light projecting device for projecting measurement light into an object, wherein the unit dispenses with a light receiving device for receiving the measurement light projected from the light projecting device so that the photographing device functions as a light receiving portion in three-dimensional measurement to conduct three-dimensional measurement in cooperation with the photographing device when the unit is attached to the photographing device; and;

wherein measurement mode information indicating a three-dimensional measurement method is transmitted to the photographing device when the unit is attached to the photographing device.

15. The three-dimensional measurement auxiliary unit according to claim 14, wherein the three-dimensional measurement auxiliary unit is an auxiliary unit for a light section method.

16. The three-dimensional measurement auxiliary unit according to claim 14, wherein the three-dimensional measurement auxiliary unit is an auxiliary unit for a stripe analysis method.

17. The three-dimensional measurement auxiliary unit according to claim 14, wherein the three-dimensional measurement auxiliary unit is an auxiliary unit for conducting three-dimensional measurement by a TOF method.

18. An imaging system for conducting three-dimensional measurement of an object and taking a two-dimensional image of the object, the system comprising:

a photographing device; and a three-dimensional measurement auxiliary unit formed in a housing provided independently of the photographing device to be removably attached to the photographing device, the photographing device being configured to be connectable to plural different types of three-dimensional measurement auxiliary units and to perform three-dimensional measurement processing depending on the respective types.

* * * * *